United States Patent
Zhang et al.

(10) Patent No.: US 12,464,526 B2
(45) Date of Patent: Nov. 4, 2025

(54) USER EQUIPMENT RECOMMENDED CONFIGURATIONS ACROSS DIFFERENT TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 671 days.

(21) Appl. No.: 17/518,255

(22) Filed: Nov. 3, 2021

(65) Prior Publication Data
US 2022/0150941 A1  May 12, 2022

Related U.S. Application Data

(60) Provisional application No. 63/110,850, filed on Nov. 6, 2020.

(51) Int. Cl.
| | | |
|---|---|---|
| *H04W 72/02* | (2009.01) | |
| *H04B 7/06* | (2006.01) | |
| *H04W 72/21* | (2023.01) | |
| *H04W 72/54* | (2023.01) | |

(52) U.S. Cl.
CPC ........ *H04W 72/21* (2023.01); *H04B 7/06952* (2023.05); *H04W 72/54* (2023.01)

(58) Field of Classification Search
CPC . H04W 72/02; H04W 72/04; H04W 72/0446; H04W 72/121; H04W 72/23; H04W 72/50; H04W 72/51; H04W 72/52; H04W 72/53; H04W 72/54; H04W 72/541; H04W 72/542; H04W 72/543; H04W 72/56
See application file for complete search history.

(56) References Cited

U.S. PATENT DOCUMENTS

| | | | |
|---|---|---|---|
| 2019/0173553 A1* | 6/2019 | Park | H04B 7/0626 |
| 2019/0215039 A1* | 7/2019 | Gao | H04B 7/0695 |
| 2020/0022004 A1* | 1/2020 | Liu | H04W 24/04 |

* cited by examiner

*Primary Examiner* — Bo Hui A Zhu
*Assistant Examiner* — Alvin Zhu
(74) *Attorney, Agent, or Firm* — Holland & Hart LLP

(57) ABSTRACT

Methods, systems, and devices for wireless communications are described. Generally, the described techniques provide for improving the reliability of downlink transmissions from a base station to a user equipment (UE). The UE may determine one or more preferred configurations for the base station to use to transmit multiple downlink transmissions to the UE, and the UE may transmit a recommendation of the preferred configuration(s) to the base station. The base station may then determine configurations to use for the multiple downlink transmissions based on the recommendation received from the UE, and the base station may transmit the downlink transmissions to the UE using the determined configurations. Because the UE may provide the recommendation of the preferred configuration(s) to the base station, the configurations used by the base station for the multiple downlink transmissions may be selected specifically for the UE. Thus, the reliability of the downlink transmissions may improve.

30 Claims, 13 Drawing Sheets

USER EQUIPMENT RECOMMENDED CONFIGURATIONS ACROSS DIFFERENT TRANSMISSIONS

CROSS REFERENCE

The present application for patent claims the benefit of U.S. Provisional Patent Application No. 63/110,850 by ZHANG et al., entitled "USER EQUIPMENT RECOMMENDED CONFIGURATIONS ACROSS DIFFERENT TRANSMISSIONS," filed Nov. 6, 2020, assigned to the assignee hereof, and expressly incorporated by reference herein.

FIELD OF TECHNOLOGY

The following relates to wireless communications, including user equipment (UE) recommended configurations across different transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

SUMMARY

The described techniques relate to improved methods, systems, devices, and apparatuses that support user equipment (UE) recommended configurations across different transmissions. Generally, the described techniques provide for improving the reliability of downlink transmissions from a base station to a UE. The UE may determine preferred configurations (e.g., multiple different configurations, one or more candidate beam configurations) for the base station to use to transmit multiple downlink transmissions to the UE (e.g., based at least in part on its measurements), and the UE may transmit a recommendation of the preferred configuration(s) to the base station. The base station may then determine configurations to use for the multiple downlink transmissions based at least in part on the recommendation received from the UE, and the base station may transmit the downlink transmissions to the UE using the determined configurations. The multiple downlink transmissions may be new transmissions or retransmissions. Because the UE may provide the recommendation of the preferred configuration(s) to the base station, the configurations used by the base station for the multiple downlink transmissions may be selected specifically for the UE. Thus, the reliability of the multiple downlink transmissions from the base station to the UE may improve compared to other different techniques.

A method for wireless communication at a user equipment (UE) is described. The method may include determining a first candidate beam configuration for a base station to use for a first downlink transmission and a second candidate beam configuration for the base station to use for a second downlink transmission, the first candidate beam configuration being different than the second candidate beam configuration, transmitting a recommendation that the base station use the first candidate beam configuration for the first downlink transmission and the second candidate beam configuration for the second downlink transmission, and receiving, based at least in part on transmitting the recommendation, the first downlink transmission and the second downlink transmission from the base station.

An apparatus for wireless communication at a UE is described. The apparatus may include a processor, and a memory coupled (e.g., operatively or in electronic communication) with the processor, wherein the memory comprises instructions executable by the processor. The instructions may be executable by the processor to cause the apparatus to determine a first candidate beam configuration for a base station to use for a first downlink transmission and a second candidate beam configuration for the base station to use for a second downlink transmission, the first candidate beam configuration being different than the second candidate beam configuration, transmit a recommendation that the base station use the first candidate beam configuration for the first downlink transmission and the second candidate beam configuration for the second downlink transmission, and receive, based at least in part on transmitting the recommendation, the first downlink transmission and the second downlink transmission from the base station.

Another apparatus for wireless communication at a UE is described. The apparatus may include means for determining a first candidate beam configuration for a base station to use for a first downlink transmission and a second candidate beam configuration for the base station to use for a second downlink transmission, the first candidate beam configuration being different than the second candidate beam configuration, means for transmitting a recommendation that the base station use the first candidate beam configuration for the first downlink transmission and the second candidate beam configuration for the second downlink transmission, and means for receiving, based at least in part on transmitting the recommendation, the first downlink transmission and the second downlink transmission from the base station.

A non-transitory computer-readable medium storing code for wireless communication at a UE is described. The code may include instructions executable by a processor to determine a first candidate beam configuration for a base station to use for a first downlink transmission and a second candidate beam configuration for the base station to use for a second downlink transmission, the first candidate beam configuration being different than the second candidate beam configuration, transmit a recommendation that the base station use the first candidate beam configuration for the first downlink transmission and the second candidate beam configuration for the second downlink transmission, and receive, based at least in part on transmitting the recommendation, the first downlink transmission and the second downlink transmission from the base station.

Some examples of the method, apparatuses, and non-transitory computer-readable medium described herein may further include operations, features, means, or instructions for receiving reference signal transmissions from the base station associated with a plurality of beam configurations, performing measurements on the references signal transmissions, and selecting the first candidate beam configuration for the first downlink transmission and the second candidate beam configuration for the second downlink transmission from the plurality of beam configurations based at least in part on performing the measurements.

In some examples of the method, apparatuses, and non-transitory computer-readable medium described herein, the reference signal transmissions include channel state information (CSI) reference signal (CSI-RS) transmissions or downlink demodulation reference signal (DMRS) transmissions. In some examples of the method, apparatuses, and non-transitory computer-readable medium described herein, the measurements include reference signal received power (RSRP) measurements, reference signal received quality (RSRQ) measurements, channel quality indicator (CQI) measurements, signal-to-interference-plus-noise ratio (SINR) measurements, or any combination thereof. In some examples of the method, apparatuses, and non-transitory computer-readable medium described herein, the first candidate beam configuration and the second candidate beam configuration include different beams, different component carriers, different sets of subbands, or any combination thereof.

Some examples of the method, apparatuses, and non-transitory computer-readable medium described herein may further include operations, features, means, or instructions for transmitting a scheduling request requesting resources for transmitting the recommendation and receiving signaling from the base station allocating the resources for transmitting the recommendation, where transmitting the recommendation includes transmitting the recommendation on the allocated resources.

In some examples of the method, apparatuses, and non-transitory computer-readable medium described herein, transmitting the recommendation may include operations, features, means, or instructions for transmitting the recommendation in uplink control information in a control channel or in a medium access control (MAC) control element (MAC-CE) in a data channel. In some examples of the method, apparatuses, and non-transitory computer-readable medium described herein, transmitting the recommendation may include operations, features, means, or instructions for transmitting the recommendation in a scheduled CSI report.

Some examples of the method, apparatuses, and non-transitory computer-readable medium described herein may further include operations, features, means, or instructions for determining that the scheduled CSI report may be scheduled to be transmitted within a threshold duration after determining the first candidate beam configuration and the second candidate beam configuration, where transmitting the recommendation in the scheduled CSI report may be based at least in part on the determining that the scheduled CSI report may be scheduled to be transmitted within the threshold duration.

In some examples of the method, apparatuses, and non-transitory computer-readable medium described herein, the recommendation may be of a plurality of candidate beam configurations for up to a maximum number of downlink transmissions. In some examples of the method, apparatuses, and non-transitory computer-readable medium described herein, the first transmission includes a new transmission or a retransmission, and the second transmission includes a new transmission or a retransmission.

A method for wireless communication at a base station is described. The method may include receiving, from a UE, a recommendation of a plurality of candidate beam configurations for the base station to use for a plurality of downlink transmissions, determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission, and transmitting, to the UE based at least in part on the determining, the first downlink transmission using the first candidate beam configuration and the second downlink transmission using the second candidate beam configuration.

An apparatus for wireless communication at a base station is described. The apparatus may include a processor, and a memory coupled (e.g., operatively or in electronic communication) with the processor, wherein the memory comprises instructions executable by the processor. The instructions may be executable by the processor to cause the apparatus to receive, from a UE, a recommendation of a plurality of candidate beam configurations for the base station to use for a plurality of downlink transmissions, determine, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission, and transmit, to the UE based at least in part on the determining, the first downlink transmission using the first candidate beam configuration and the second downlink transmission using the second candidate beam configuration.

Another apparatus for wireless communication at a base station is described. The apparatus may include means for receiving, from a UE, a recommendation of a plurality of candidate beam configurations for the base station to use for a plurality of downlink transmissions, means for determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission, and means for transmitting, to the UE based at least in part on the determining, the first downlink transmission using the first candidate beam configuration and the second downlink transmission using the second candidate beam configuration.

A non-transitory computer-readable medium storing code for wireless communication at a base station is described. The code may include instructions executable by a processor to receive, from a UE, a recommendation of a plurality of candidate beam configurations for the base station to use for a plurality of downlink transmissions, determine, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission, and transmit, to the UE based at least in part on the determining, the first downlink transmission using the first candidate beam configuration and the second downlink transmission using the second candidate beam configuration.

Some examples of the method, apparatuses, and non-transitory computer-readable medium described herein may further include operations, features, means, or instructions for transmitting reference signal transmissions to the UE using at least a plurality of beam configurations, where receiving the recommendation of the plurality of candidate beam configurations for the base station may be based at least in part on transmitting the reference signal transmissions.

In some examples of the method, apparatuses, and non-transitory computer-readable medium described herein, the reference signal transmissions include CSI-RS transmissions or DMRS transmissions. In some examples of the method, apparatuses, and non-transitory computer-readable medium described herein, the first candidate beam configuration and the second candidate beam configuration include different beams, different component carriers, different sets of subbands, or any combination thereof.

Some examples of the method, apparatuses, and non-transitory computer-readable medium described herein may further include operations, features, means, or instructions for receiving a scheduling request requesting resources for the recommendation and transmitting signaling to the UE allocating the resources for the recommendation, where receiving the recommendation includes receiving the recommendation on the allocated resources.

In some examples of the method, apparatuses, and non-transitory computer-readable medium described herein, receiving the recommendation may include operations, features, means, or instructions for receiving the recommendation in uplink control information in a control channel or in a MAC-CE in a data channel. In some examples of the method, apparatuses, and non-transitory computer-readable medium described herein, receiving the recommendation may include operations, features, means, or instructions for receiving the recommendation in an scheduled CSI report.

In some examples of the method, apparatuses, and non-transitory computer-readable medium described herein, the recommendation may be of the plurality of candidate beam configurations for up to a maximum number of downlink transmissions. In some examples of the method, apparatuses, and non-transitory computer-readable medium described herein, the first transmission includes a new transmission or a retransmission, and the second transmission includes a new transmission or a retransmission.

DETAILED DESCRIPTION

In some wireless communications systems, a base station may be capable of transmitting downlink data to a user equipment (UE) using many configurations. A configuration may refer to a beam, component carrier, or set of subbands, among other examples, used for a downlink transmission. A set of subbands may include one or more subbands. The support of different configurations may improve the reliability of communications between the base station and the UE. For instance, the base station may achieve transmit diversity by transmitting downlink data to the UE on different subbands. Accordingly, if the UE experiences interference on one of the subbands, the UE may still be able to receive the downlink data on a different subband. In some cases, however, the base station may be configured to select a single best configuration for multiple downlink transmissions to the UE. As a result, the base station may not be able to benefit from using different configurations across multiple downlink transmissions, and the reliability of the multiple downlink transmissions may be relatively low.

As described herein, a wireless communications system may support efficient techniques for improving the reliability of downlink transmissions from a base station to a UE. The UE may determine preferred configurations for the base station to use to transmit multiple downlink transmissions to the UE, and the UE may transmit a recommendation of the preferred configurations (e.g., multiple different configurations, one or more candidate beam configurations) to the base station. The base station may then determine configurations to use for the multiple downlink transmissions based at least in part on the recommendation received from the UE, and the base station may transmit the downlink transmissions to the UE using the determined configurations. Because the UE may provide the recommendation of the preferred configuration(s) to the base station, the configurations used by the base station for the multiple downlink transmissions may be selected specifically for the UE (e.g., based at least in part on the UE's measurements). Further, the use of different configurations for the multiple downlink transmissions may increase the diversity of the multiple downlink transmissions. Thus, the reliability of the multiple downlink transmissions from the base station to the UE may improve.

Aspects of the disclosure introduced above are described below in the context of a wireless communications system. Examples of processes and signaling exchanges that support UE recommended configurations across different transmissions are then described. Aspects of the disclosure are further illustrated by and described with reference to apparatus diagrams, system diagrams, and flowcharts that relate to UE recommended configurations across different transmissions.

Figure 1:
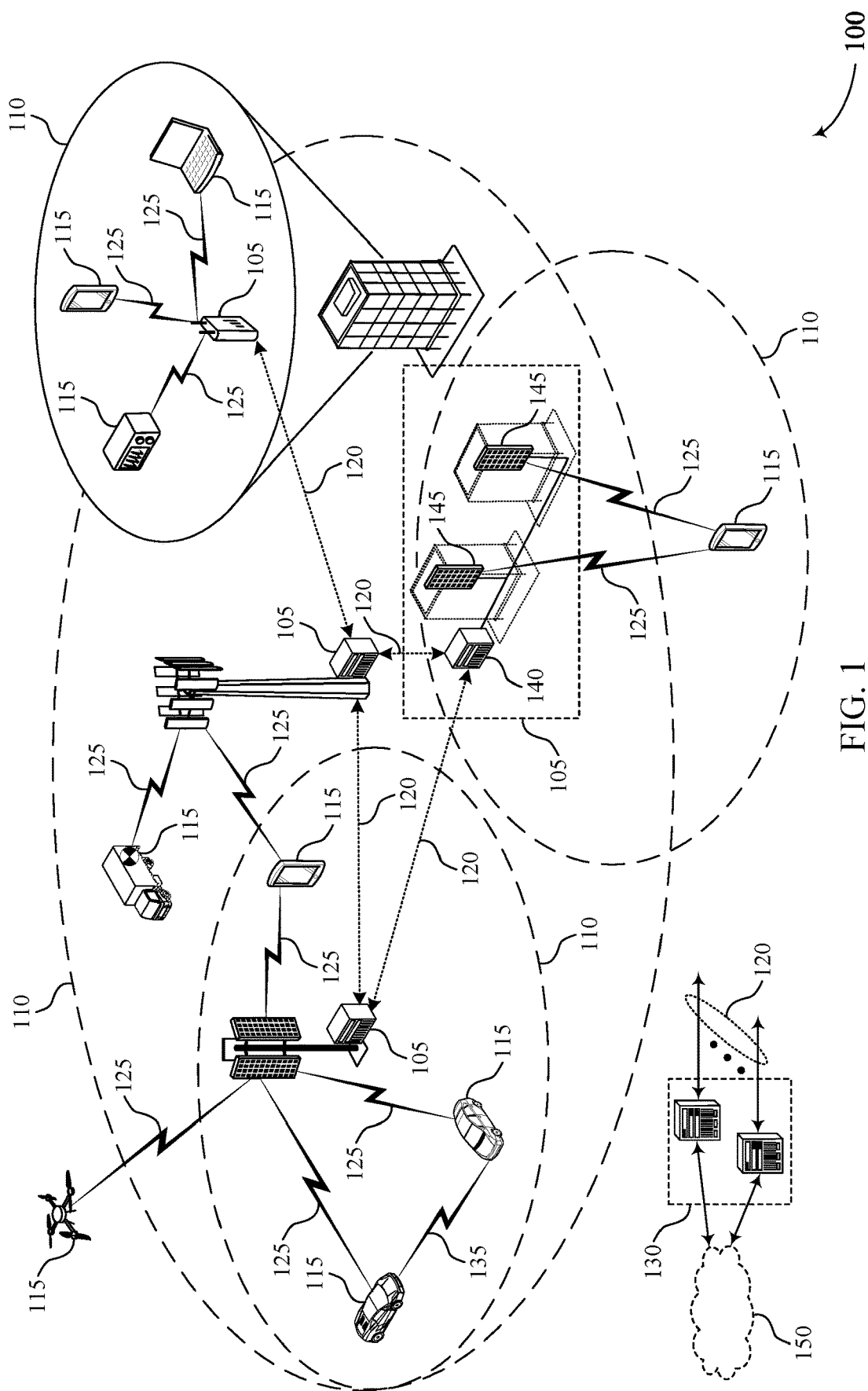
FIG. 1 illustrates an example of a wireless communications system that supports user equipment (UE) recommended configurations across different transmissions in accordance with aspects of the present disclosure.

FIG. 1 illustrates an example of a wireless communications system 100 that supports UE recommended configurations across different transmissions in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based at least in part on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based at least in part on listening according to different receive configuration directions (e.g., a beam direction determined to have a highest signal strength, highest signal-to-noise ratio (SNR), or otherwise acceptable signal quality based at least in part on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, a base station 105 may be capable of transmitting downlink data to a UE 115 using many configurations. A configuration may refer to a beam, component carrier, subband, set of subbands, etc. used for a downlink transmission. A set of subbands may include one or more subbands. The support of different configurations may improve the reliability of communications between the base station 105 and the UE 115. For instance, the base station 105 may achieve transmit diversity by transmitting downlink data to the UE 115 on different subbands. Accordingly, if the UE 115 experiences interference on one of the subbands, the UE 115 may still be able to receive the downlink data on a different subband.

In some cases, however, the base station 105 may be configured to select a single best configuration for multiple downlink transmissions to the UE 115. For instance, the base station 105 may assign a single beam index, a component carrier index, or a subband index across different transmissions and retransmissions (e.g., for each PDSCH transmission or retransmission). As a result, the base station 105 may not be able to benefit from using different configurations across multiple downlink transmissions, and the reliability of the multiple downlink transmissions may be relatively low. Wireless communications system 100 may support efficient techniques for improving the reliability of downlink transmissions from a base station 105 to a UE 115. The UE 115 may determine preferred configurations (e.g., multiple different configurations, one or more candidate beam configurations) for the base station 105 to use to transmit multiple downlink transmissions to the UE 115 (e.g., based at least in part on measurements performed by the UE 115), and the UE 115 may transmit a recommendation of the preferred configuration(s) to the base station 105. The base station 105 may then determine configurations to use for the multiple downlink transmissions based at least in part on the recommendation received from the UE 115, and the base station may transmit the downlink transmissions to the UE 115 using the determined configurations.

Figure 2:
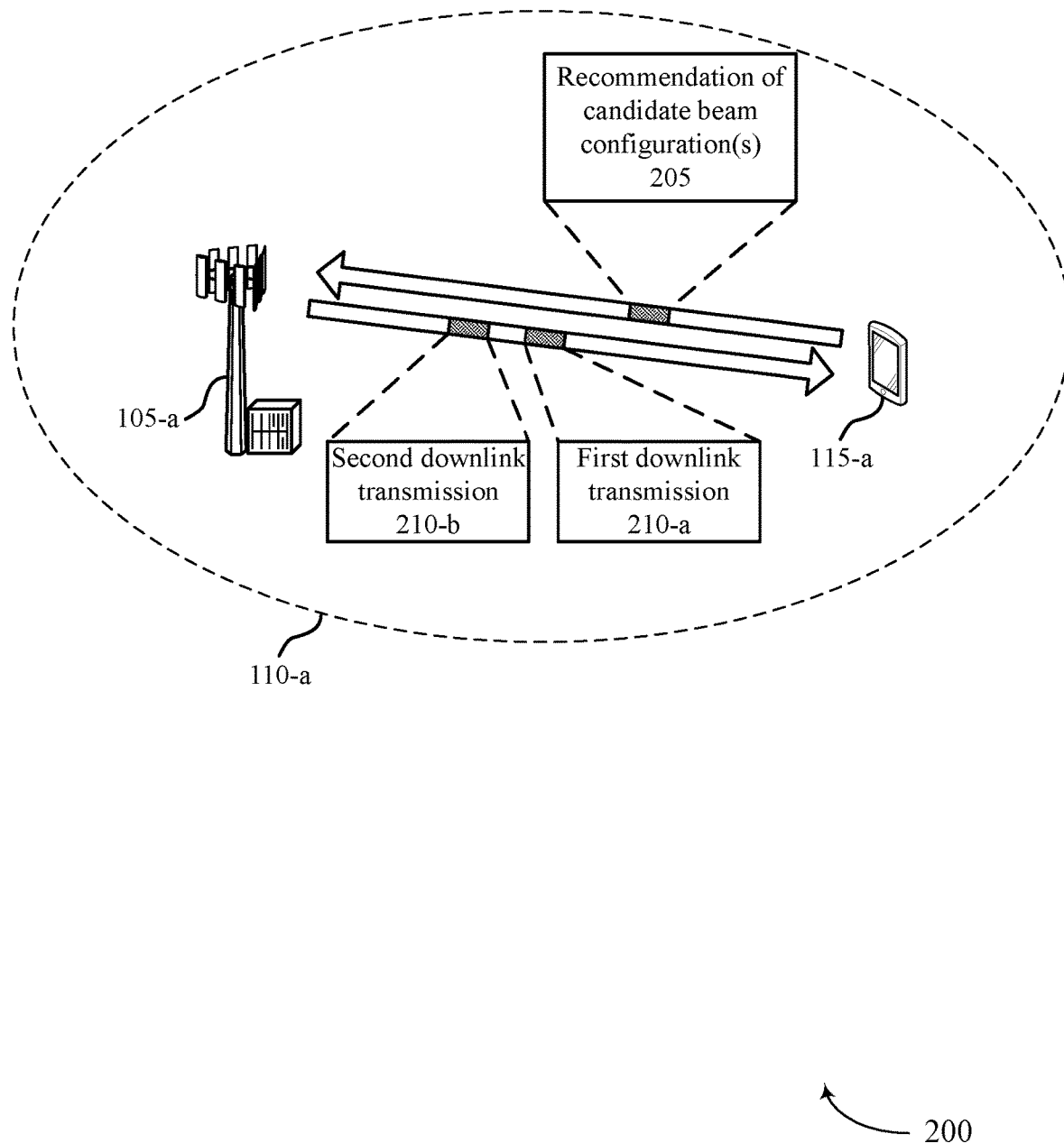
FIG. 2 illustrates an example of a wireless communications system that supports UE recommended configurations across different transmissions in accordance with aspects of the present disclosure.

FIG. 2 illustrates an example of a wireless communications system 200 that supports UE recommended configurations across different transmissions in accordance with aspects of the present disclosure. The wireless communications system 200 includes a UE 115-*a*, which may be an example of a UE 115 described with reference to FIG. 1. The wireless communications system 200 also includes a base station 105-*a*, which may be an example of a base station 105 described with reference to FIG. 1. The base station 105-*a* may provide communication coverage for a coverage area 110-*a*. The wireless communications system 200 may implement aspects of the wireless communications system 100. For example, the wireless communications system 200 may support efficient techniques for improving the reliability of downlink transmissions from the base station 105-*a* to the UE 115-*a*.

In wireless communications system 200, the base station 105-*a* and the UE 115-*a* may support the use of multiple configurations across multiple downlink transmissions. Specifically, the base station 105-a may use different beams, component carriers, subbands, or sets of subbands across multiple downlink transmissions to improve the reliability of the downlink transmissions. The UE 115-a may provide assistance information to the base station 105-a indicating a recommendation of a preferred beam index, component carrier index, or subband index, among other examples, across the different transmissions and retransmissions (e.g., for each of a set of PDSCH transmissions, including first, second, third, etc. transmissions or retransmissions). That is, instead of the base station 105-a assigning a single or same beam index, component carrier index, or subband index across different transmissions and retransmissions, the UE 115-a may recommend and signal to the base station 105-a preferred beam indices, component carrier indices, and subband indices across different transmissions and retransmissions (e.g., including first, second, third, etc. transmissions or retransmissions). In some cases, the base station 105-a may indicate when the UE 115-a is to recommend and signal to the base station 105-a the preferred beam indices, component carrier indices, and subband indices. For example, the base station 105-a may indicate to the UE 115-a (e.g., communicate a triggering event, time period, or both) that the UE 115-a is to recommend and signal to the base station 105-a the preferred beam indices, component carrier indices, and subband indices. In some cases, the UE 115-a may know when the UE 115-a is to recommend and signal to the base station 105-a the preferred beam indices, component carrier indices, and subband indices based at least in part on a particular condition or characteristic being satisfied. For example, the UE 115-a may know to recommend and signal to the base station 105-a the preferred beam indices, component carrier indices, and subband indices when a number of component carriers are used in a particular downlink transmission, when a number of subbands are used in a particular downlink transmission, when the base station 105-a is to send one or more retransmissions, etc. In some cases, the UE 115-a is to recommend and signal to the base station 105-a the preferred beam indices, component carrier indices, and subband indices at a time period different from a scheduled CSI report having a configured CSI reporting interval or opportunity for the UE 115-a.

The UE 115-a may transmit, and the base station 105-a may receive, the recommendation 205 of one or more candidate beam configurations (e.g., multiple different configurations) for the base station 105-a to use for multiple downlink transmissions. The recommendation 205 may be referred to as a recommendation message including the one or more candidate beam configurations. The UE 115-a may identify the candidate beam configurations to recommend to the base station 105-a for the multiple downlink transmissions based at least in part on measurements performed on reference signals received from the base station 105-a (e.g., CSI-RSs or downlink demodulation reference signals (DMRSs)). For instance, the UE 115-a may receive reference signals on multiple beams, component carriers, subbands, or sets of subbands, and the UE 115-a may perform measurements on at least some of the reference signals. The UE 115-a may then select the beams, component carriers, subbands, or sets of subbands associated with the best measurements (e.g., highest values of reference signal received power (RSRP), reference signal received quality (RSRQ), or signal-to-interference-plus-noise ratio (SINR)) to recommend to the base station 105-a. Then, the UE 115-a may transmit an indication of the one or more selected beams, component carriers, subbands, or sets of subbands in the recommendation 205 to the base station 105-a.

In FIG. 2, there may be a maximum of two transmissions and/or retransmissions allowed, in some examples, due to a delay budget (e.g., within eight slots). In this example and other examples, there may be a first downlink transmission 210-a and a second downlink transmission 210-b. Thus, the recommendation 205 may indicate candidate beam configurations for the first downlink transmission 210-a and the second downlink transmission 210-b. The recommendation signaling from the UE 115-a may include the preferred beam, component carrier, or subband index per transmission or retransmission for up to a maximum quantity of transmissions and/or retransmissions or up to quantity of transmissions and/or retransmissions indicated or configured by the base station 105-a. The beam indices, component carrier indices, or subband indices may be different per transmission or retransmission. Further, the subband index may correspond to a single subband or a set of subbands.

In some aspects (e.g., if there is a maximum of two transmissions), the UE 115-a may support four active beams. In such aspects, the recommendation 205 may indicate which two beams may be used for the two transmissions and/or retransmissions based at least in part on latest measurements (e.g., measurements performed on CSI-RSs or downlink DMRSs received in a beam sweep). The UE 115-a may recommend that the base station 105-a change a beam index across the two transmissions and/or retransmissions due to link degradation or blockage. Specifically, there may be beam index changing on retransmissions due to link degradation or blockage. Thus, the UE 115-a and the base station 105-a may identify a second beam for the base station 105-a to use to transmit the second downlink transmission 210-b based at least in part on link degradation or blockage between the UE 115-a and the base station 105-a. In another example, the UE 115-a and the base station 105-a may identify a second best beam for the base station 105-a to use to transmit the second downlink transmission 210-b to improve reliability of transmissions between the UE 115-a and the base station 105-a.

In other aspects (e.g., if there is a maximum of two transmissions), the UE 115-a may be served on four component carriers (e.g., the UE 115-a may have access to four component carriers for communications with the base station 105-a). In such aspects, the recommendation 205 may indicate which two component carriers may be used for the two transmissions and/or retransmissions based at least in part on latest measurements performed per component carrier (e.g., measurements performed on CSI-RSs or downlink DMRSs). The UE 115-a may recommend that the base station 105-a change a component carrier index across the two transmissions and/or retransmissions due to channel changes or resource allocation (e.g., a different channel or resource allocation for the second downlink transmission 210-b). Specifically, there may be component carrier index changing on retransmissions due to a channel change, resource allocation, etc. Thus, the UE 115-a and the base station 105-a may identify a second component carrier for the base station 105-a to use to transmit the second downlink transmission 210-b based at least in part on a channel change or a resource allocation for the second downlink transmission 210-b.

In yet other aspects (e.g., if there is maximum of two transmissions), there may be eight subbands available for communications between the UE 115-a and the base station 105-a. In such aspects, the recommendation 205 may indicate which two subbands or which two sets of subbands may be used for the two transmissions and/or retransmissions based at least in part on latest measurements performed per subband (e.g., based at least in part on a subband channel quality indicator (CQI) determined via CSI-RSs). The UE 115-a may recommend that the base station 105-a change a subband index across the two transmissions and/or retransmissions due to channel changes or resource allocation (e.g., a different channel or resource allocation for the second downlink transmission 210-b). Specifically, there may be subband index changing on retransmissions due to channel change, resource allocation, etc. Thus, the UE 115-a and the base station 105-a may identify a second subband or set of subbands for the base station 105-a to use to transmit the second downlink transmission 210-b based at least in part on a channel change or a resource allocation for the second downlink transmission 210-b.

The UE 115-a may support one or more techniques for transmitting the recommendation 205 to the base station 105-a.

In some examples, the UE 115-a may transmit a scheduling request (SR) to the base station 105-a to request resources for transmitting the recommendation 205. The base station 105-a may then allocate resources to the UE 115-a for transmitting the recommendation 205, and the UE 115-a may transmit the recommendation 205 to the base station 105-a on the allocated resources.

In other examples, the UE 115-a may transmit the recommendation 205 in uplink control information or a MAC control element (MAC-CE). The uplink control information may be in a PUCCH for an existing allocation (e.g., a PUCCH configured independent of the recommendation 205). Similarly, the MAC-CE may be in a PUSCH for an existing allocation (e.g., a PUSCH configured independent of the recommendation 205).

In yet other examples, the UE 115-a may transmit the recommendation 205 in a CSI report (e.g., a CSI report that will otherwise be sent). The CSI report may be periodic or aperiodic and may correspond to a CSI report scheduled independent of the recommendation 205. In such examples, the UE 115-a may determine whether the CSI report is scheduled within a threshold duration of time after determining the candidate beam configurations to include in the recommendation (e.g., after the recommendation 205 is ready to transmit). If the CSI report is scheduled within the threshold duration of time, the UE 115-a may transmit the recommendation 205 in the CSI report. If the CSI report is scheduled after the threshold duration of time, the UE 115-a may transmit the recommendation 205 outside of the scheduled CSI reporting interval or opportunity (e.g., in uplink control information or a MAC-CE).

Once the UE 115-a transmits the recommendation 205, the base station 105-a may receive the recommendation 205 and determine candidate beam configurations for downlink transmissions to the UE 115-a based at least in part on the recommendation 205. The base station 105-a may determine a first candidate beam configuration for the first downlink transmission 210-a and a second candidate beam configuration for the second downlink transmission 210-b based at least in part on the recommendation 205. The base station 105-a may then transmit the first downlink transmission 210-a using the first candidate beam configuration and the second downlink transmission 210-b using the second candidate beam configuration. For instance, the base station 105-a may transmit the first downlink transmission 210-a on a first beam, component carrier, subband, or set of subbands corresponding to the first candidate beam configuration. Similarly, the base station 105-a may transmit the second downlink transmission 210-a on a second beam, component carrier, subband, or set of subbands corresponding to the second candidate beam configuration. Thus, in line with the present disclosure, wireless communications system 200 may support efficient techniques for improving the reliability of downlink transmissions from the base station 105-a to the UE 115-a.

Figure 3:
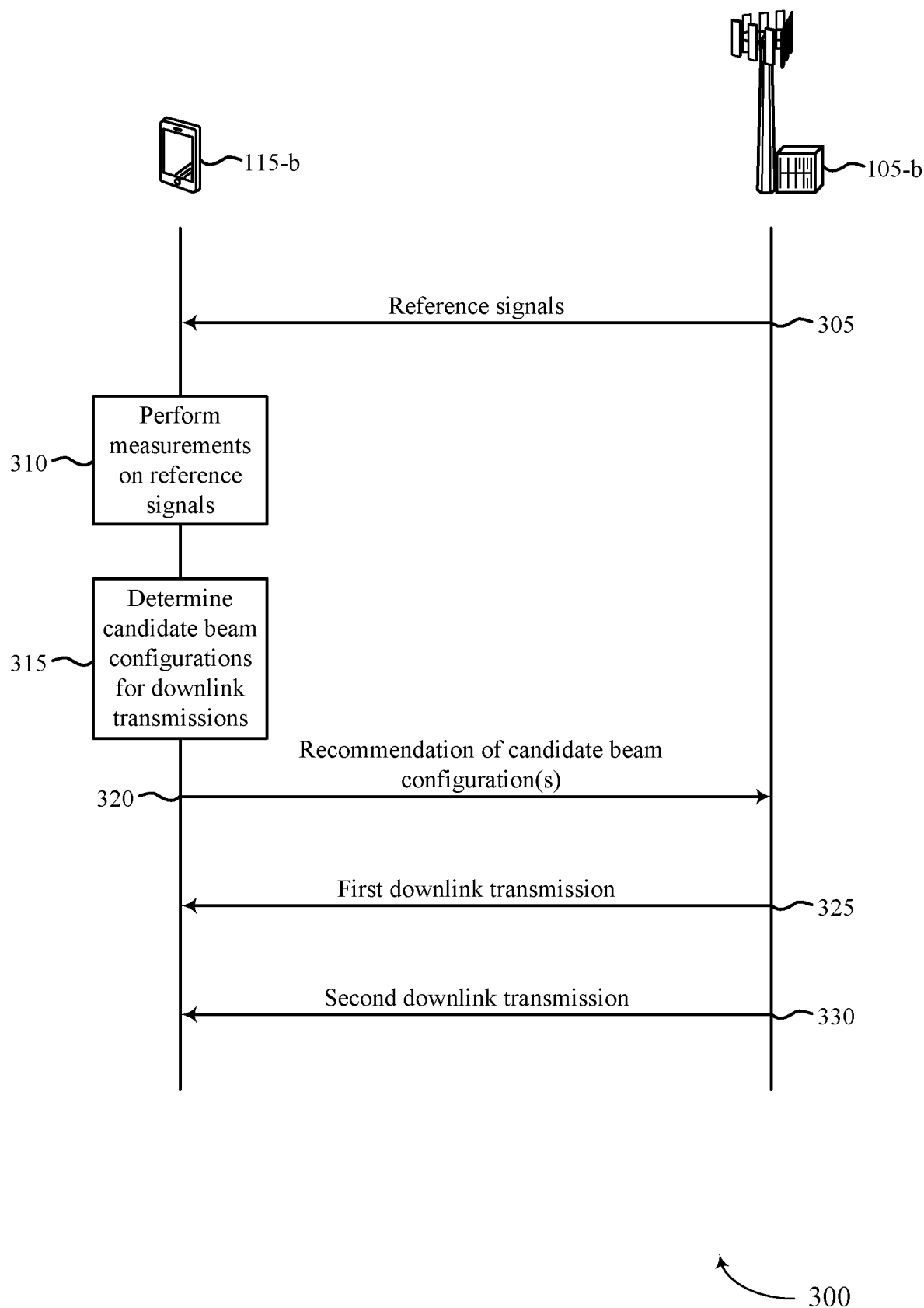
FIG. 3 illustrates an example of a process flow that supports UE recommended configurations across different transmissions in accordance with aspects of the present disclosure.

FIG. 3 illustrates an example of a process flow 300 that supports UE recommended configurations across different transmissions in accordance with aspects of the present disclosure. The process flow 300 illustrates aspects of techniques performed by a UE 115-b, which may be an example of a UE 115 described with reference to FIGS. 1 and 2. The process flow 300 also illustrates aspects of techniques performed by a base station 105-b, which may be an example of a base station 105 described with reference to FIGS. 1 and 2. The process flow 300 may implement aspects of the wireless communications system 100 and the wireless communications system 200 described with reference to FIGS. 1 and 2, respectively. For example, the process flow may support efficient techniques for improving the reliability of downlink transmissions from the base station 105-b to the UE 115-b.

In the following description of the process flow 300, the messages between the UE 115-b and the base station 105-b may be transmitted in a different order than the example order shown, or the operations performed by the base station 105 and the UE 115 may be performed in different orders or at different times. Some operations may also be omitted from the process flow 300, and other operations may be added to the process flow 300.

At 305, the base station 105-b may transmit, and the UE 115-b may receive, reference signal transmissions transmitted using a plurality of beam configurations. The reference signal transmissions may include CSI-RS transmissions or downlink DMRS transmissions. The plurality of beam configurations may correspond to different beams, different component carriers, or different sets of subbands.

At 310, the UE 115-b may perform measurements on the reference signal transmissions. The measurements may include RSRP measurements, RSRQ measurements, CQI measurements, or SINR measurements, other examples, or any combination thereof. At 315, the UE 115-b may then determine candidate beam configurations for the base station 105-b to use for downlink transmissions to the UE 115-b based at least in part on the measurements.

As an example, the UE 115-b may determine a first candidate beam configuration (e.g., first beam, first component carrier, or first set of subbands) for the base station 105-b to use for a first downlink transmission and a second candidate beam configuration (e.g., first beam, first component carrier, or first set of subbands) for the base station 105-b to use for a second downlink transmission (e.g., where the first and second candidate beam configurations are different). The UE 115-b may select the first candidate beam configuration for the first downlink transmission and the second candidate beam configuration for the second downlink transmission from the plurality of beam configurations based at least in part on the measurements performed at 310. For instance, the UE 115-b may determine that the first and second candidate beam configurations are associated with the best (e.g., highest) measurements (e.g., highest values of RSRP, RSRQ, or SINR). As such, the UE 115-b may select the first and second candidate beam configurations for the downlink transmissions from the base station 105-b.

At 320, the UE 115-b may transmit a recommendation (e.g., recommendation message indicating) that the base station 105-b use the first candidate beam configuration for the first downlink transmission and the second candidate beam configuration for the second downlink transmission. The recommendation may include a plurality of candidate beam configurations for up to a maximum number of downlink transmissions.

In some aspects, the UE 115-b may transmit an SR request to request resources for transmitting the recommendation. In such aspects, the base station 105-b may transmit, and the UE 115-b may receive, signaling allocating the resources for transmitting the recommendation. The UE 115-b may then transmit, and the base station 105-b may receive, the recommendation on the allocated resources. In other aspects, the UE 115-b may transmit, and the base station 105-b may receive, the recommendation in uplink control information in a control channel or in a MAC-CE in a data channel. In yet other aspects, the UE 115-b may transmit, and the base station 105-b may receive, the recommendation in a scheduled CSI report (e.g., based on an existing CSI reporting interval or opportunity configured for the UE 115-b). In such aspects, the UE 115-b may determine that the scheduled CSI report is scheduled to be transmitted within a threshold duration after determining the first candidate beam configuration and the second candidate beam configuration. That is, the UE 115-b may transmit the recommendation in the scheduled CSI report based at least in part on determining that the scheduled CSI report is scheduled to be transmitted within the threshold duration.

After receiving the recommendation, the base station 105-b may determine a configuration for the first downlink transmission based at least in part on the first candidate beam configuration recommended by the UE 115-b. The determined configuration may be the same as or different from the first candidate beam configuration recommended by the UE 115-b. At 325, the base station 105-b may then transmit, and the UE 115-b may receive, the first downlink transmission using the determined configuration. The first downlink transmission may be a new transmission (e.g., first or initial transmission) of downlink data or a retransmission of downlink data.

Similarly, after receiving the recommendation, the base station 105-b may determine a configuration for the second downlink transmission based at least in part on the second candidate beam configuration recommended by the UE 115-b. The determined configuration may be the same as or different from the second candidate beam configuration recommended by the UE 115-b. At 330, the base station 105-b may then transmit, and the UE 115-b may receive, the second downlink transmission using the determined configuration. The second downlink transmission may be a new transmission (e.g., first or initial transmission) of downlink data or a retransmission of downlink data.

Figure 4:
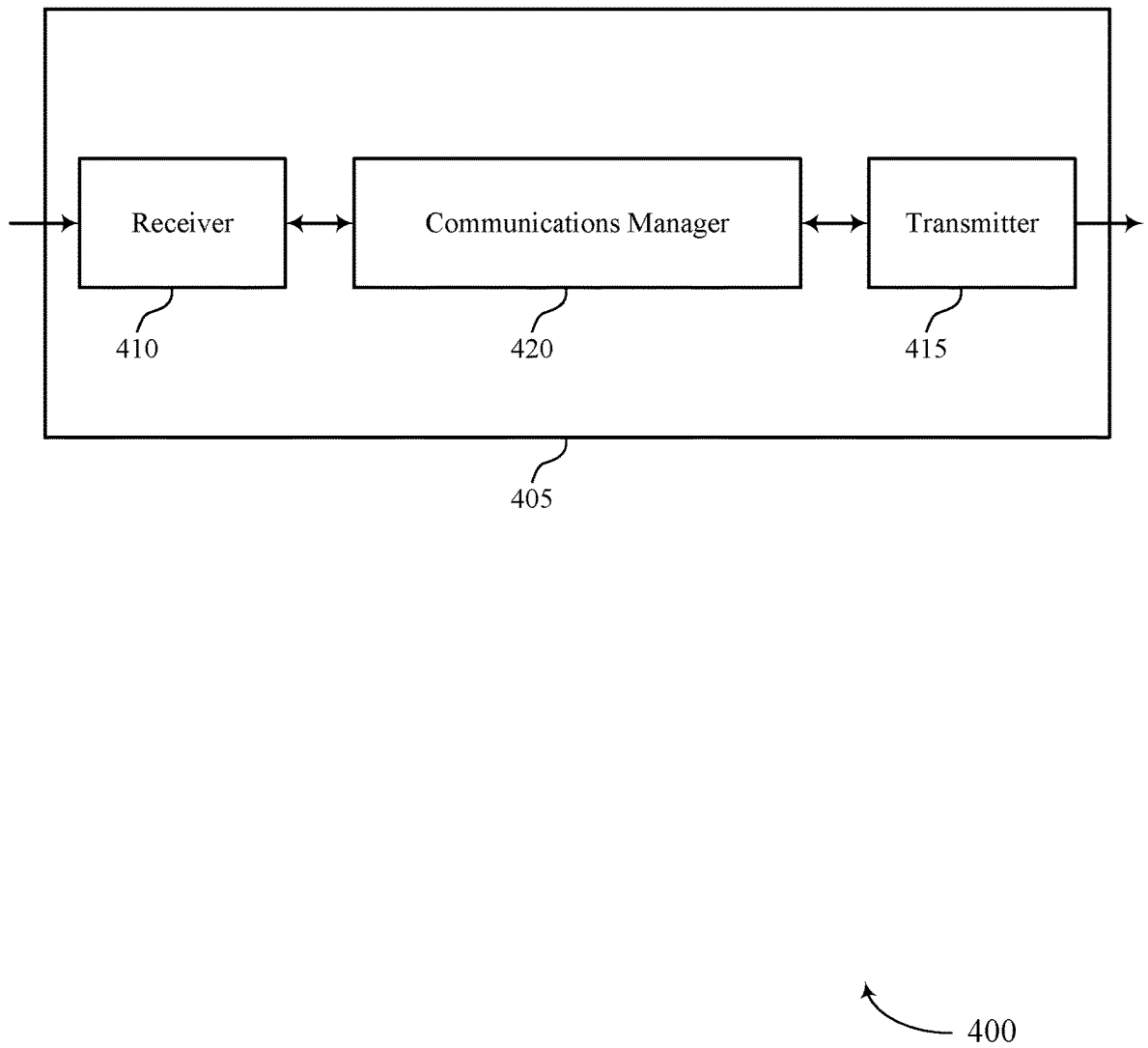
FIGS. 4 and 5 show block diagrams of devices that support UE recommended configurations across different transmissions in accordance with aspects of the present disclosure.

FIG. 4 shows a block diagram 400 of a device 405 that supports UE recommended configurations across different transmissions in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to UE recommended configurations across different transmissions). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to UE recommended configurations across different transmissions). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of UE recommended configurations across different transmissions as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and a memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for determining a first candidate beam configuration for a base station to use for a first downlink transmission and a second candidate beam configuration for the base station to use for a second downlink transmission, the first candidate beam configuration being different than the second candidate beam configuration. The communications manager 420 may be configured as or otherwise support a means for transmitting a recommendation that the base station use the first candidate beam configuration for the first downlink transmission and the second candidate beam configuration for the second downlink transmission. The communications manager 420 may be configured as or otherwise support a means for receiving, based at least in part on transmitting the recommendation, the first downlink transmission and the second downlink transmission from the base station.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reducing power consumption and utilizing resources more efficiently. In particular, because the communications manager 420 may recommend configurations for a base station to use for downlink transmissions, the reliability of the downlink transmissions may be improved, and the communications manager 420 may avoid wasting power and resources to receive retransmissions of downlink data.

Figure 5:
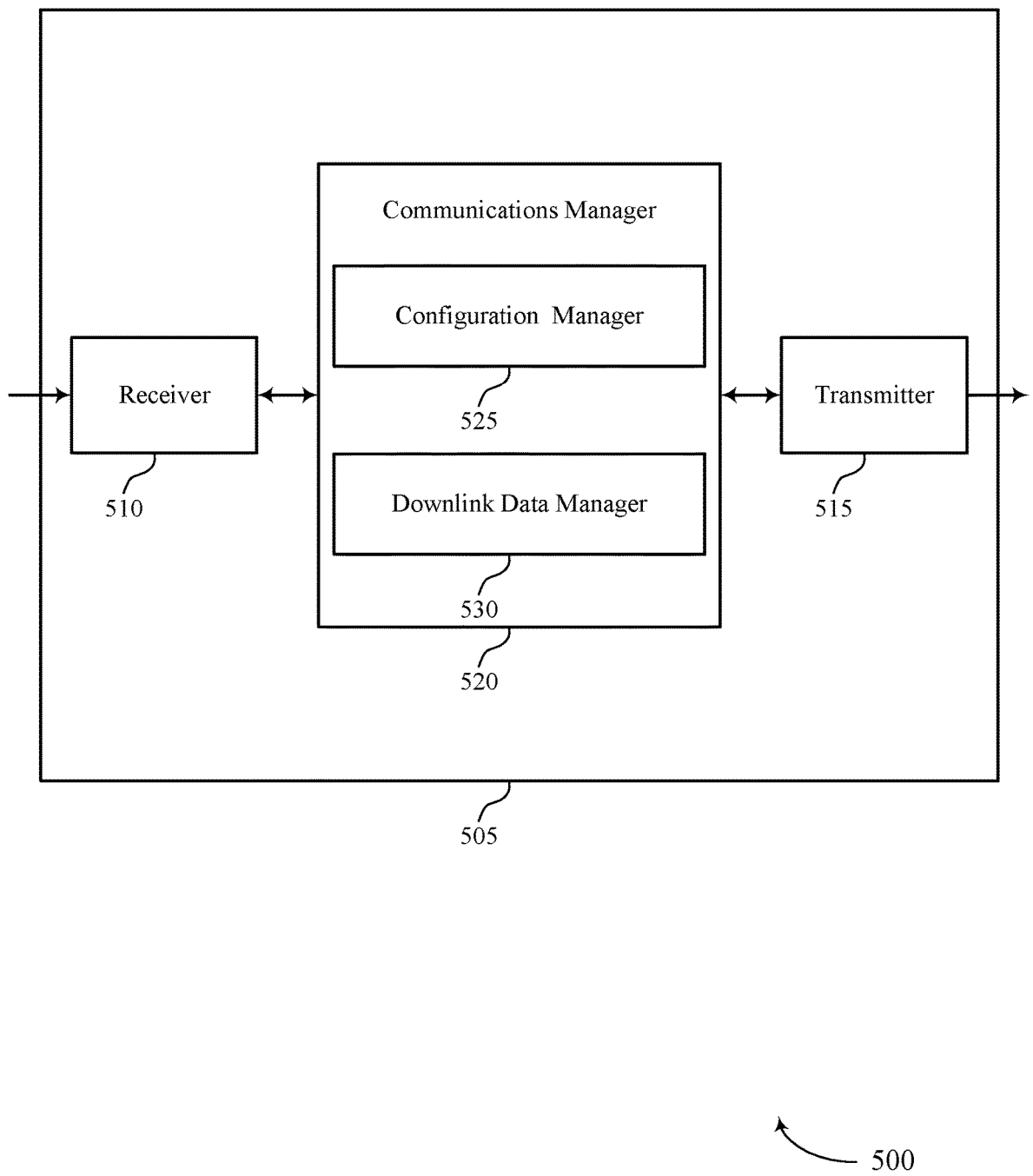

FIG. 5 shows a block diagram 500 of a device 505 that supports UE recommended configurations across different transmissions in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to UE recommended configurations across different transmissions). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to UE recommended configurations across different transmissions). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of UE recommended configurations across different transmissions as described herein. For example, the communications manager 520 may include a configuration manager 525 a downlink data manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The configuration manager 525 may be configured as or otherwise support a means for determining a first candidate beam configuration for a base station to use for a first downlink transmission and a second candidate beam configuration for the base station to use for a second downlink transmission, the first candidate beam configuration being different than the second candidate beam configuration. The configuration manager 525 may be configured as or otherwise support a means for transmitting a recommendation that the base station use the first candidate beam configuration for the first downlink transmission and the second candidate beam configuration for the second downlink transmission. The downlink data manager 530 may be configured as or otherwise support a means for receiving, based at least in part on transmitting the recommendation, the first downlink transmission and the second downlink transmission from the base station.

Figure 6:
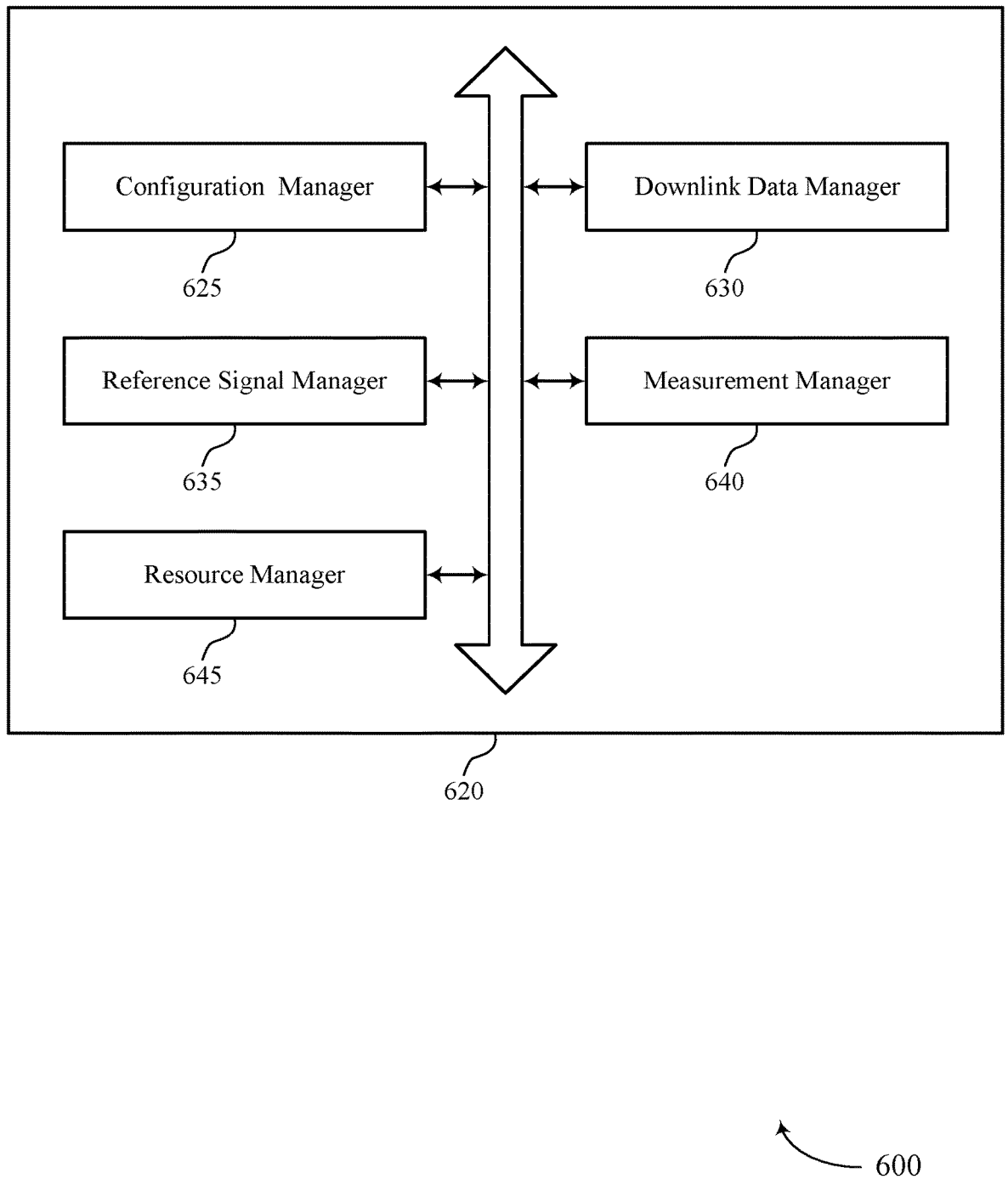
FIG. 6 shows a block diagram of a communications manager that supports UE recommended configurations across different transmissions in accordance with aspects of the present disclosure.

FIG. 6 shows a block diagram 600 of a communications manager 620 that supports UE recommended configurations across different transmissions in accordance with aspects of the present disclosure. The communications manager 620 may be an example of aspects of a communications manager 420, a communications manager 520, or both, as described herein. The communications manager 620, or various components thereof, may be an example of means for performing various aspects of UE recommended configurations across different transmissions as described herein. For example, the communications manager 620 may include a configuration manager 625, a downlink data manager 630, a reference signal manager 635, a measurement manager 640, a resource manager 645, or any combination thereof. Each of these components may communicate, directly or indirectly, with one another (e.g., via one or more buses).

The communications manager 620 may support wireless communication at a UE in accordance with examples as disclosed herein. The configuration manager 625 may be configured as or otherwise support a means for determining a first candidate beam configuration for a base station to use for a first downlink transmission and a second candidate beam configuration for the base station to use for a second downlink transmission, the first candidate beam configuration being different than the second candidate beam configuration. In some examples, the configuration manager 625 may be configured as or otherwise support a means for transmitting a recommendation that the base station use the first candidate beam configuration for the first downlink transmission and the second candidate beam configuration for the second downlink transmission. The downlink data manager 630 may be configured as or otherwise support a means for receiving, based at least in part on transmitting the recommendation, the first downlink transmission and the second downlink transmission from the base station.

In some examples, the reference signal manager 635 may be configured as or otherwise support a means for receiving reference signal transmissions from the base station associated with a plurality of beam configurations (e.g., transmitted by the base station using the plurality of beam configurations). In some examples, the measurement manager 640 may be configured as or otherwise support a means for performing measurements on the references signal transmissions. In some examples, the configuration manager 625 may be configured as or otherwise support a means for selecting the first candidate beam configuration for the first downlink transmission and the second candidate beam configuration for the second downlink transmission from the plurality of beam configurations based at least in part on performing the measurements.

In some examples, the reference signal transmissions include CSI-RS transmissions or downlink DMRS transmissions.

In some examples, the measurements include RSRP measurements, RSRQ measurements, CQI measurements, SINR measurements, or any combination thereof.

In some examples, the first candidate beam configuration and the second candidate beam configuration include different beams, different component carriers, different sets of subbands, or any combination thereof.

In some examples, the resource manager 645 may be configured as or otherwise support a means for transmitting a scheduling request requesting resources for transmitting the recommendation. In some examples, the resource manager 645 may be configured as or otherwise support a means for receiving signaling from the base station allocating the resources for transmitting the recommendation, where transmitting the recommendation includes transmitting the recommendation on the allocated resources.

In some examples, to support transmitting the recommendation, the configuration manager 625 may be configured as or otherwise support a means for transmitting the recommendation in uplink control information in a control channel or in a MAC-CE in a data channel.

In some examples, to support transmitting the recommendation, the configuration manager 625 may be configured as or otherwise support a means for transmitting the recommendation in a scheduled CSI report.

In some examples, the configuration manager 625 may be configured as or otherwise support a means for determining that the scheduled CSI report is scheduled to be transmitted within a threshold duration after determining the first candidate beam configuration and the second candidate beam configuration, where transmitting the recommendation in the scheduled CSI report is based at least in part on the determining that the scheduled CSI report is scheduled to be transmitted within the threshold duration.

In some examples, the recommendation is of a plurality of candidate beam configurations for up to a maximum number of downlink transmissions.

In some examples, the first transmission includes a new transmission or a retransmission, and the second transmission includes a new transmission or a retransmission.

Figure 7:
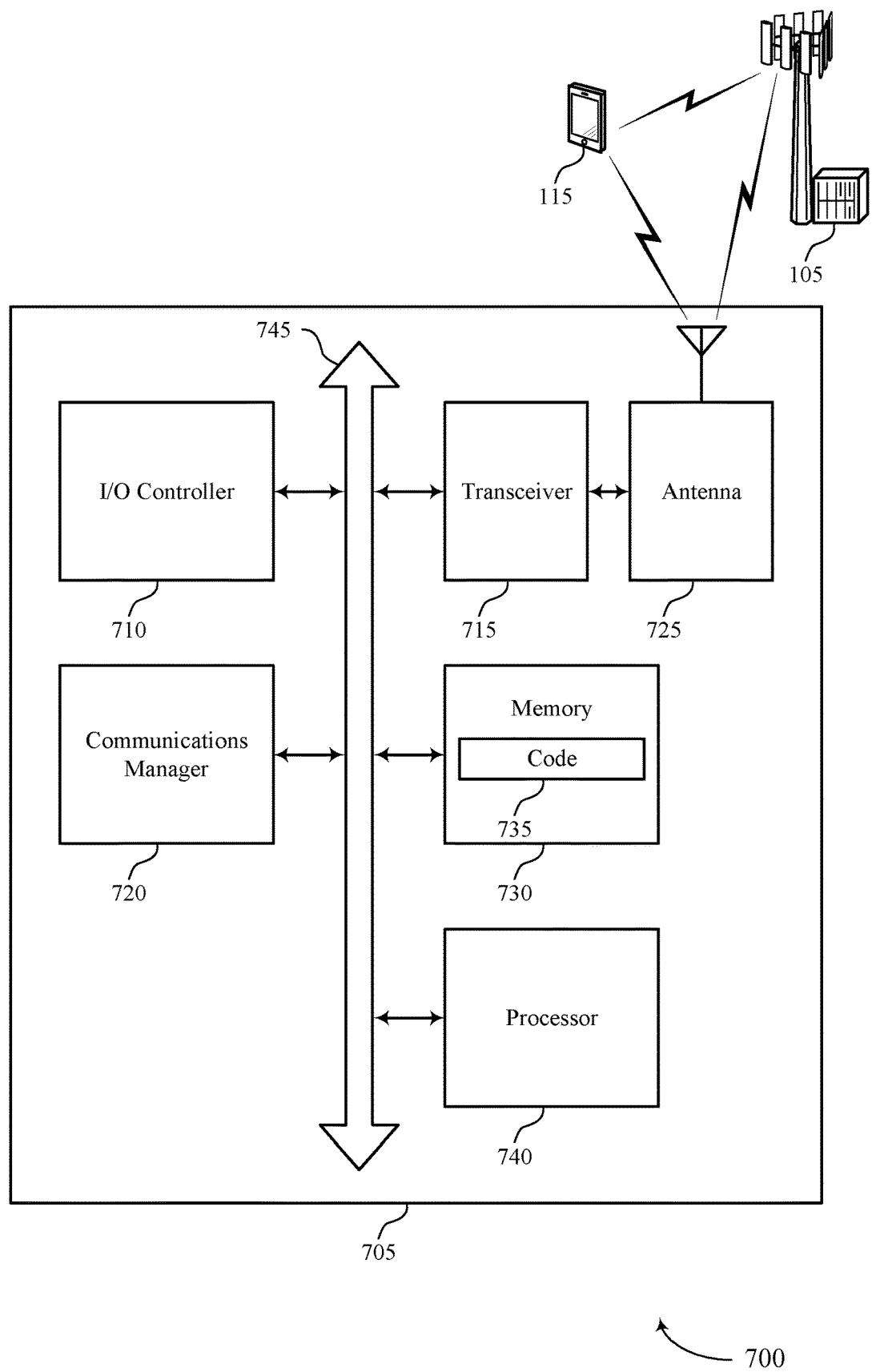
FIG. 7 shows a diagram of a system including a device that supports UE recommended configurations across different transmissions in accordance with aspects of the present disclosure.

FIG. 7 shows a diagram of a system 700 including a device 705 that supports UE recommended configurations across different transmissions in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting UE recommended configurations across different transmissions). For example, the device 705 or a component of the device 705 may include a processor 740 and a memory 730 coupled to the processor 740, the processor 740 and the memory 730 configured to perform various functions described herein.

The communications manager 720 may support wireless communication at a UE in accordance with examples as disclosed herein. For example, the communications manager 720 may be configured as or otherwise support a means for determining a first candidate beam configuration for a base station to use for a first downlink transmission and a second candidate beam configuration for the base station to use for a second downlink transmission, the first candidate beam configuration being different than the second candidate beam configuration. The communications manager 720 may be configured as or otherwise support a means for transmitting a recommendation that the base station use the first candidate beam configuration for the first downlink transmission and the second candidate beam configuration for the second downlink transmission. The communications manager 720 may be configured as or otherwise support a means for receiving, based at least in part on transmitting the recommendation, the first downlink transmission and the second downlink transmission from the base station.

By including or configuring the communications manager 720 in accordance with examples as described herein, the device 705 may support techniques for reducing power consumption and utilizing resources more efficiently. In particular, because the communications manager 720 may recommend configurations for a base station to use for downlink transmissions, the reliability of the downlink transmissions may be improved, and the communications manager 720 may avoid wasting power and resources to receive retransmissions of downlink data.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of UE recommended configurations across different transmissions as described herein, or the processor 740 and the memory 730 may be otherwise configured to perform or support such operations.

Figure 8:
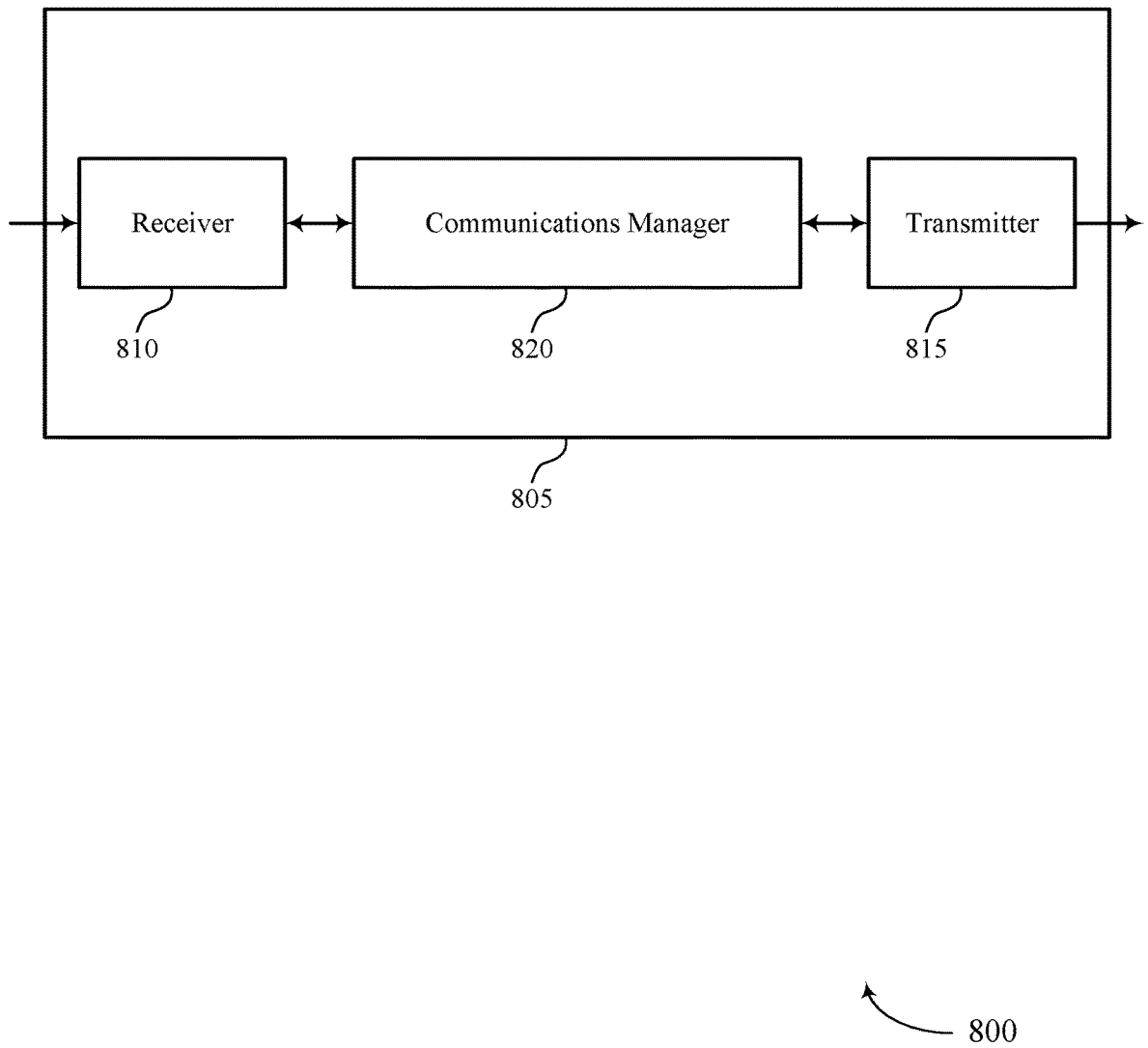
FIGS. 8 and 9 show block diagrams of devices that support UE recommended configurations across different transmissions in accordance with aspects of the present disclosure.

FIG. 8 shows a block diagram 800 of a device 805 that supports UE recommended configurations across different transmissions in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to UE recommended configurations across different transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to UE recommended configurations across different transmissions). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of UE recommended configurations across different transmissions as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and a memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for receiving, from a UE, a recommendation of a plurality of candidate beam configurations for the base station to use for a plurality of downlink transmissions. The communications manager 820 may be configured as or otherwise support a means for determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission. The communications manager 820 may be configured as or otherwise support a means for transmitting, to the UE based at least in part on the determining, the first downlink transmission using the first candidate beam configuration and the second downlink transmission using the second candidate beam configuration.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reducing power consumption and utilizing resources more efficiently. In particular, because the communications manager 820 may select configurations to use for downlink transmissions based at least in part on a recommendation from a UE, the reliability of the downlink transmissions may be improved, and the communications manager 820 may avoid wasting power and resources to retransmit downlink data to the UE.

Figure 9:
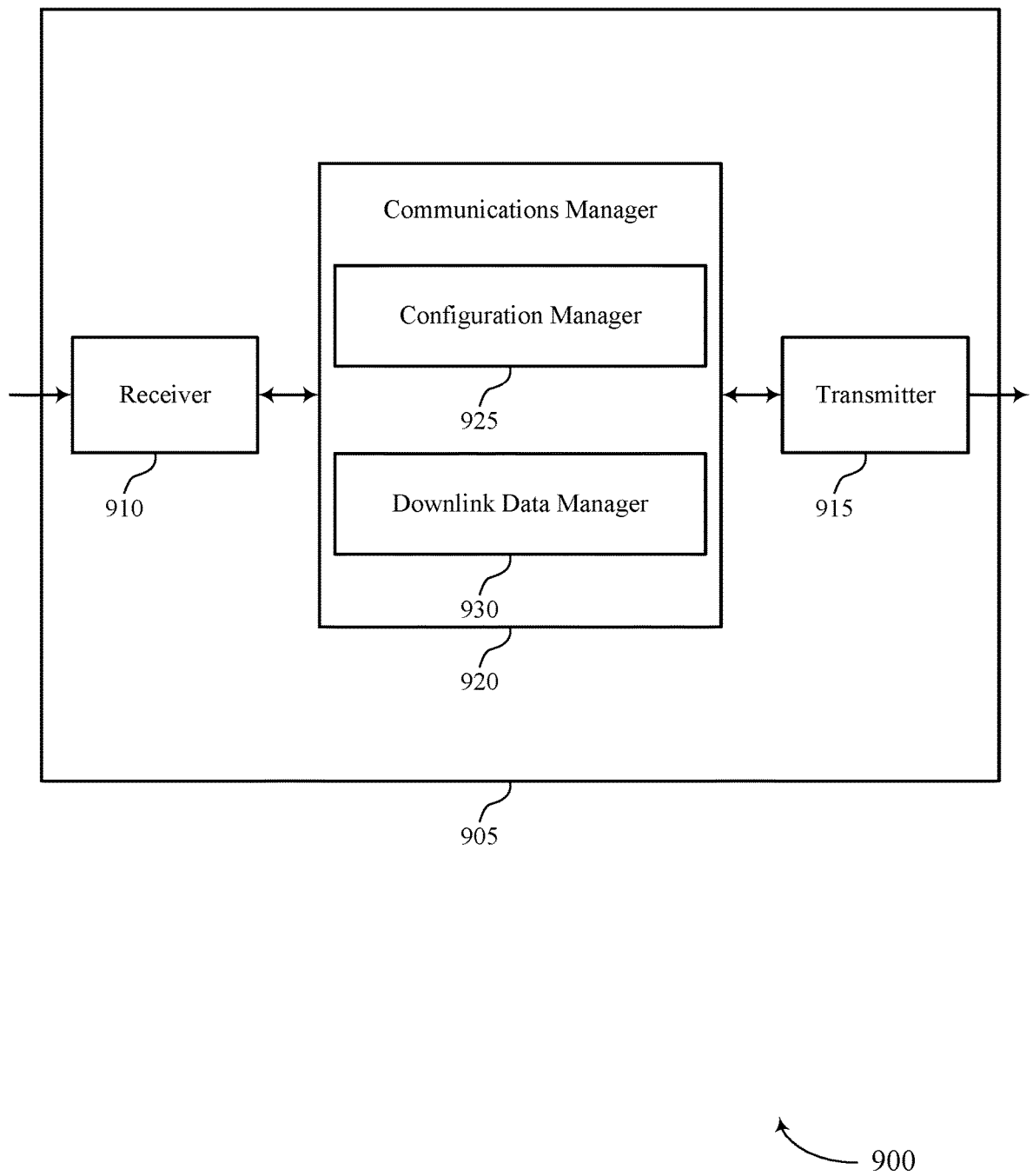

FIG. 9 shows a block diagram 900 of a device 905 that supports UE recommended configurations across different transmissions in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to UE recommended configurations across different transmissions). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to UE recommended configurations across different transmissions). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of UE recommended configurations across different transmissions as described herein. For example, the communications manager 920 may include a configuration manager 925 a downlink data manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The configuration manager 925 may be configured as or otherwise support a means for receiving, from a UE, a recommendation of a plurality of candidate beam configurations for the base station to use for a plurality of downlink transmissions. The configuration manager 925 may be configured as or otherwise support a means for determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission. The downlink data manager 930 may be configured as or otherwise support a means for transmitting, to the UE based at least in part on the determining, the first downlink transmission using the first candidate beam configuration and the second downlink transmission using the second candidate beam configuration.

Figure 10:
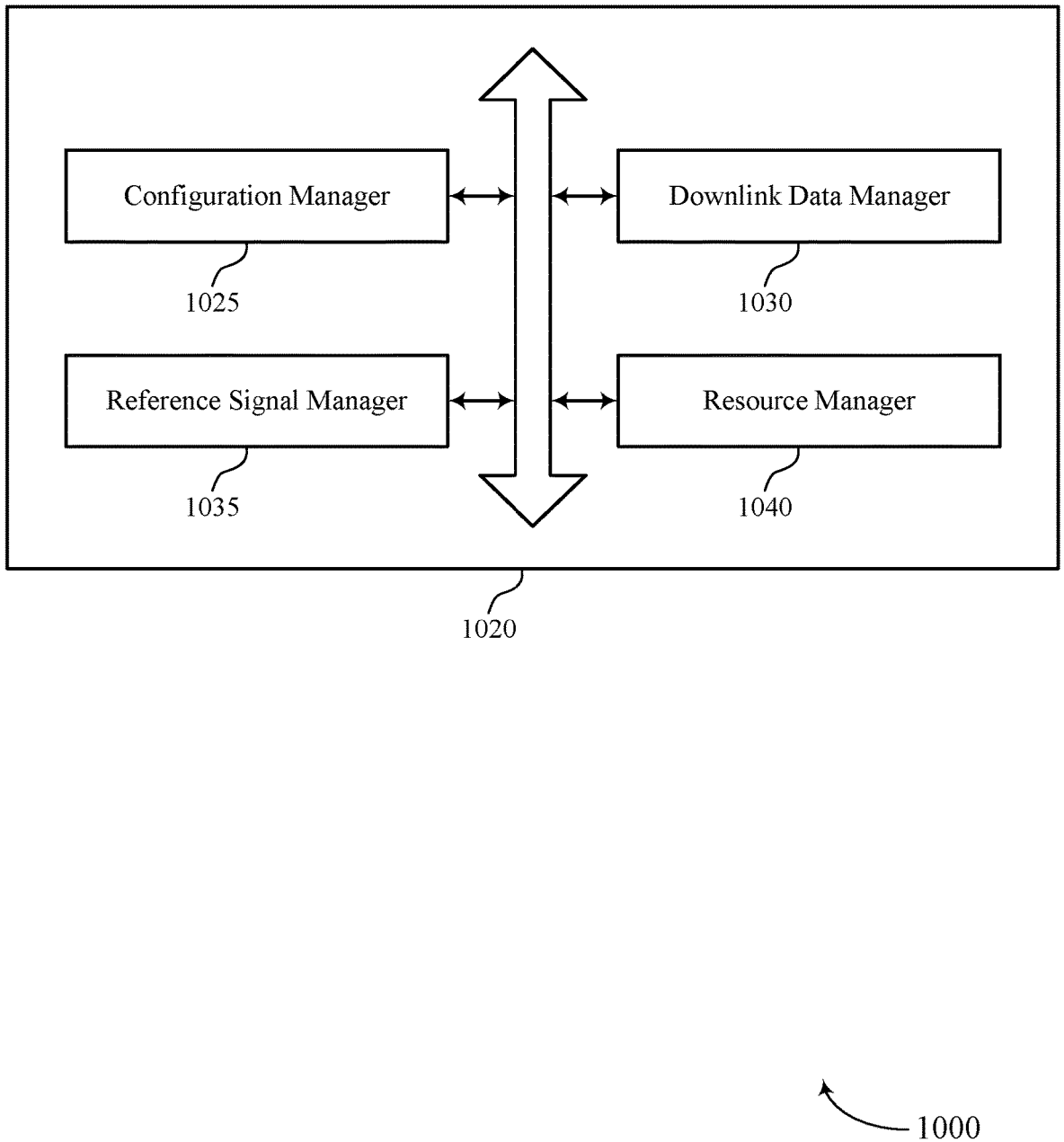
FIG. 10 shows a block diagram of a communications manager that supports UE recommended configurations across different transmissions in accordance with aspects of the present disclosure.

FIG. 10 shows a block diagram 1000 of a communications manager 1020 that supports UE recommended configurations across different transmissions in accordance with aspects of the present disclosure. The communications manager 1020 may be an example of aspects of a communications manager 820, a communications manager 920, or both, as described herein. The communications manager 1020, or various components thereof, may be an example of means for performing various aspects of UE recommended configurations across different transmissions as described herein. For example, the communications manager 1020 may include a configuration manager 1025, a downlink data manager 1030, a reference signal manager 1035, a resource manager 1040, or any combination thereof. Each of these components may communicate, directly or indirectly, with one another (e.g., via one or more buses).

The communications manager 1020 may support wireless communication at a base station in accordance with examples as disclosed herein. The configuration manager 1025 may be configured as or otherwise support a means for receiving, from a UE, a recommendation of a plurality of candidate beam configurations for the base station to use for a plurality of downlink transmissions. In some examples, the configuration manager 1025 may be configured as or otherwise support a means for determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission. The downlink data manager 1030 may be configured as or otherwise support a means for transmitting, to the UE based at least in part on the determining, the first downlink transmission using the first candidate beam configuration and the second downlink transmission using the second candidate beam configuration.

In some examples, the reference signal manager 1035 may be configured as or otherwise support a means for transmitting reference signal transmissions to the UE using at least a plurality of beam configurations, where the recommendation of the plurality of candidate beam configurations for the base station is based at least in part on transmitting the reference signal transmissions.

In some examples, the reference signal transmissions include CSI-RS transmissions or downlink DMRS transmissions.

In some examples, the first candidate beam configuration and the second candidate beam configuration include different beams, different component carriers, different sets of subbands, or any combination thereof.

In some examples, the resource manager 1040 may be configured as or otherwise support a means for receiving a scheduling request requesting resources for the recommendation. In some examples, the resource manager 1040 may be configured as or otherwise support a means for transmitting signaling to the UE allocating the resources for the recommendation, where receiving the recommendation includes receiving the recommendation on the allocated resources.

In some examples, to support receiving the recommendation, the configuration manager 1025 may be configured as or otherwise support a means for receiving the recommendation in uplink control information in a control channel or in a MAC-CE in a data channel.

In some examples, to support receiving the recommendation, the configuration manager 1025 may be configured as or otherwise support a means for receiving the recommendation in a scheduled CSI report.

In some examples, the recommendation is of the plurality of candidate beam configurations for up to a maximum number of downlink transmissions.

In some examples, the first transmission includes a new transmission or a retransmission, and the second transmission includes a new transmission or a retransmission.

Figure 11:
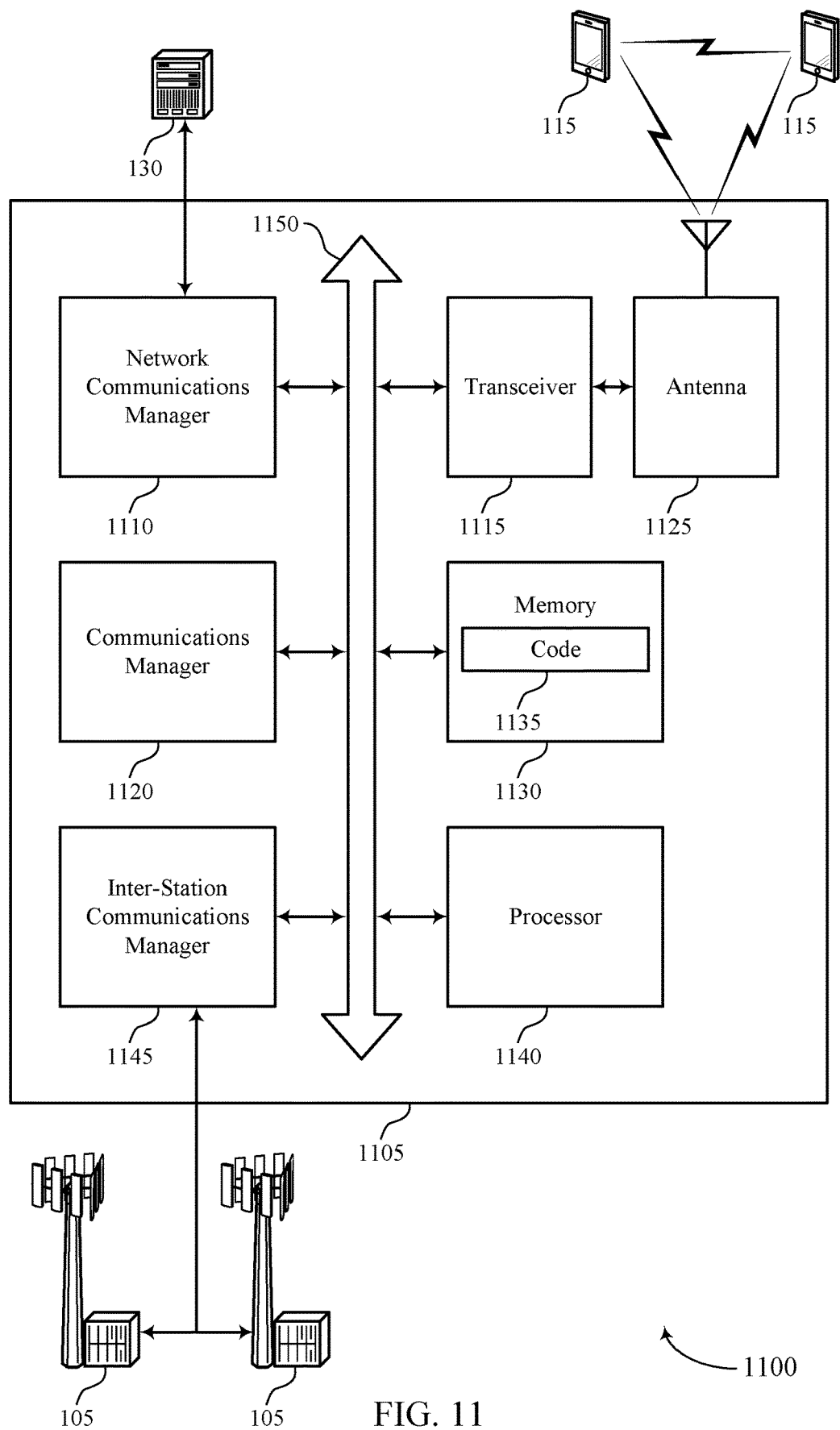
FIG. 11 shows a diagram of a system including a device that supports UE recommended configurations across different transmissions in accordance with aspects of the present disclosure.

FIG. 11 shows a diagram of a system 1100 including a device 1105 that supports UE recommended configurations across different transmissions in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting UE recommended configurations across different transmissions). For example, the device 1105 or a component of the device 1105 may include a processor 1140 and a memory 1130 coupled to the processor 1140, the processor 1140 and the memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for receiving, from a UE, a recommendation of a plurality of candidate beam configurations for the base station to use for a plurality of downlink transmissions. The communications manager 1120 may be configured as or otherwise support a means for determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission. The communications manager 1120 may be configured as or otherwise support a means for transmitting, to the UE based at least in part on the determining, the first downlink transmission using the first candidate beam configuration and the second downlink transmission using the second candidate beam configuration.

By including or configuring the communications manager 1120 in accordance with examples as described herein, the device 1105 may support techniques for reducing power consumption and utilizing resources more efficiently. In particular, because the communications manager 1120 may select configurations to use for downlink transmissions based at least in part on a recommendation from a UE, the reliability of the downlink transmissions may be improved, and the communications manager 1120 may avoid wasting power and resources to retransmit downlink data to the UE.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of UE recommended configurations across different transmissions as described herein, or the processor 1140 and the memory 1130 may be otherwise configured to perform or support such operations.

Figure 12:
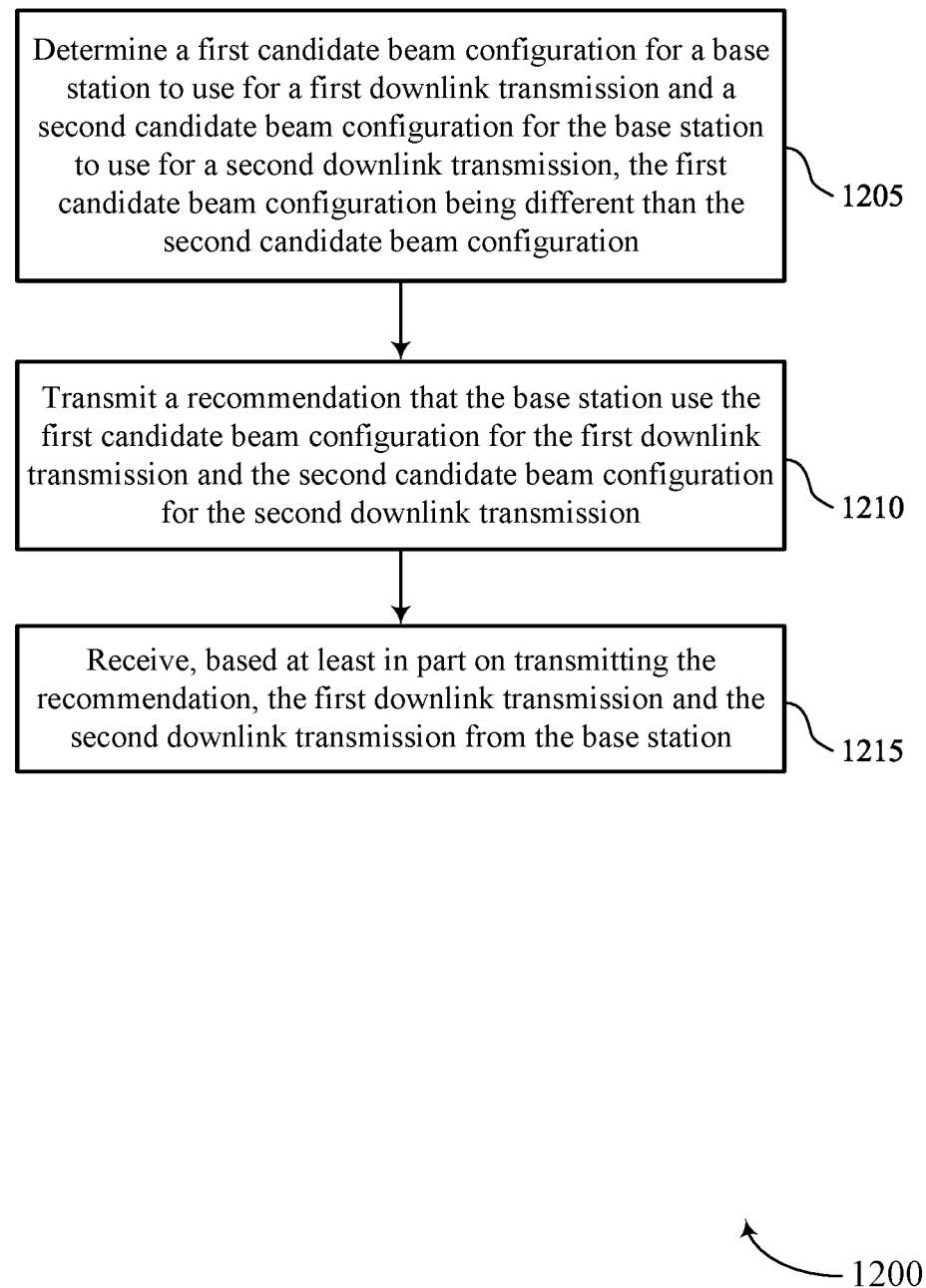
FIGS. 12 and 13 show flowcharts illustrating methods that support UE recommended configurations across different transmissions in accordance with aspects of the present disclosure.

FIG. 12 shows a flowchart illustrating a method 1200 that supports UE recommended configurations across different transmissions in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include determining a first candidate beam configuration for a base station to use for a first downlink transmission and a second candidate beam configuration for the base station to use for a second downlink transmission, the first candidate beam configuration being different than the second candidate beam configuration. The operations of 1205 may be performed in accordance with examples as disclosed herein. In some examples, aspects of the operations of 1205 may be performed by a configuration manager 625 as described with reference to FIG. 6.

At 1210, the method may include transmitting a recommendation that the base station use the first candidate beam configuration for the first downlink transmission and the second candidate beam configuration for the second downlink transmission. The operations of 1210 may be performed in accordance with examples as disclosed herein. In some examples, aspects of the operations of 1210 may be performed by a configuration manager 625 as described with reference to FIG. 6.

At 1215, the method may include receiving, based at least in part on transmitting the recommendation, the first downlink transmission and the second downlink transmission from the base station. The operations of 1215 may be performed in accordance with examples as disclosed herein.

In some examples, aspects of the operations of 1215 may be performed by a downlink data manager 630 as described with reference to FIG. 6.

Figure 13:
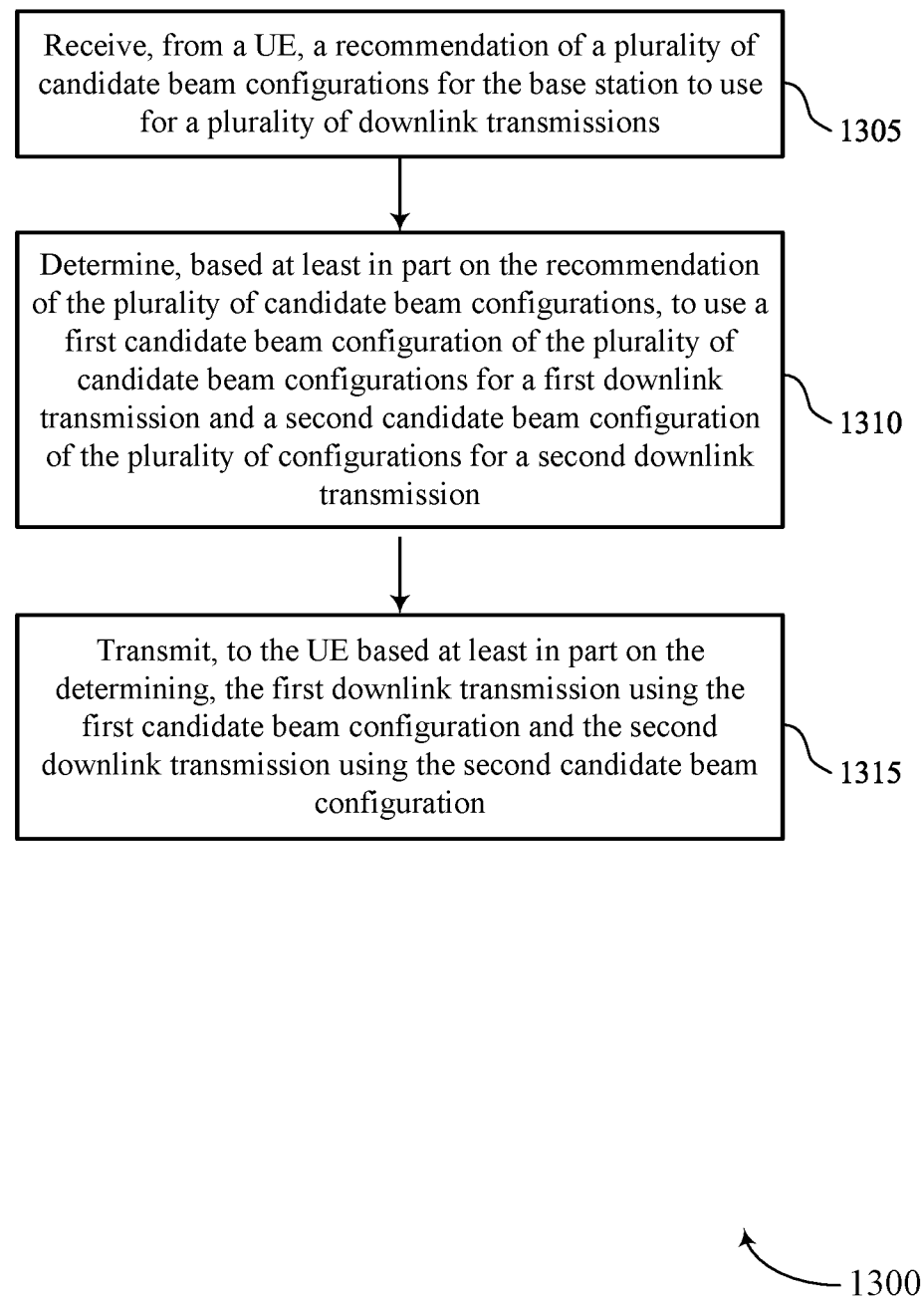

FIG. 13 shows a flowchart illustrating a method 1300 that supports UE recommended configurations across different transmissions in accordance with aspects of the present disclosure. The operations of the method 1300 may be implemented by a base station or its components as described herein. For example, the operations of the method 1300 may be performed by a base station 105 as described with reference to FIGS. 1 through 3 and 8 through 11. In some examples, a base station may execute a set of instructions to control the functional elements of the base station to perform the described functions. Additionally, or alternatively, the base station may perform aspects of the described functions using special-purpose hardware.

At 1305, the method may include receiving, from a UE, a recommendation of a plurality of candidate beam configurations for the base station to use for a plurality of downlink transmissions. The operations of 1305 may be performed in accordance with examples as disclosed herein. In some examples, aspects of the operations of 1305 may be performed by a configuration manager 1025 as described with reference to FIG. 10.

At 1310, the method may include determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission. The operations of 1310 may be performed in accordance with examples as disclosed herein. In some examples, aspects of the operations of 1310 may be performed by a configuration manager 1025 as described with reference to FIG. 10.

At 1315, the method may include transmitting, to the UE based at least in part on the determining, the first downlink transmission using the first candidate beam configuration and the second downlink transmission using the second candidate beam configuration. The operations of 1315 may be performed in accordance with examples as disclosed herein. In some examples, aspects of the operations of 1315 may be performed by a downlink data manager 1030 as described with reference to FIG. 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining a first candidate beam configuration for a base station to use for a first downlink transmission and a second candidate beam configuration for the base station to use for a second downlink transmission, the first candidate beam configuration being different than the second candidate beam configuration; transmitting a recommendation that the base station use the first candidate beam configuration for the first downlink transmission and the second candidate beam configuration for the second downlink transmission; and receiving, based at least in part on transmitting the recommendation, the first downlink transmission and the second downlink transmission from the base station.

Aspect 2: The method of aspect 1, further comprising: receiving reference signal transmissions from the base station associated with a plurality of beam configurations; performing measurements on the references signal transmissions; and selecting the first candidate beam configuration for the first downlink transmission and the second candidate beam configuration for the second downlink transmission from the plurality of beam configurations based at least in part on performing the measurements.

Aspect 3: The method of aspect 2, wherein the reference signal transmissions comprise CSI-RS transmissions or downlink DMRS transmissions.

Aspect 4: The method of any of aspects 2 through 3, wherein the measurements comprise RSRP measurements, RSRQ measurements, CQI measurements, SINR measurements, or any combination thereof.

Aspect 5: The method of any of aspects 1 through 4, wherein the first candidate beam configuration and the second candidate beam configuration comprise different beams, different component carriers, different sets of sub-bands, or any combination thereof.

Aspect 6: The method of any of aspects 1 through 5, further comprising: transmitting a scheduling request requesting resources for transmitting the recommendation; and receiving signaling from the base station allocating the resources for transmitting the recommendation, wherein transmitting the recommendation comprises transmitting the recommendation on the allocated resources.

Aspect 7: The method of any of aspects 1 through 6, wherein transmitting the recommendation comprises: transmitting the recommendation in uplink control information in a control channel or in a MAC-CE in a data channel.

Aspect 8: The method of any of aspects 1 through 7, wherein transmitting the recommendation comprises: transmitting the recommendation in a scheduled CSI report.

Aspect 9: The method of any of aspects 1 through 8, further comprising: determining that the scheduled CSI report is scheduled to be transmitted within a threshold duration after determining the first candidate beam configuration and the second candidate beam configuration, wherein transmitting the recommendation in the scheduled CSI report is based at least in part on the determining that the scheduled CSI report is scheduled to be transmitted within the threshold duration.

Aspect 10: The method of any of aspects 1 through 9, wherein the recommendation is of a plurality of candidate beam configurations for up to a maximum number of downlink transmissions.

Aspect 11: The method of any of aspects 1 through 10, wherein the first transmission comprises a new transmission or a retransmission, and the second transmission comprises a new transmission or a retransmission.

Aspect 12: A method for wireless communication at a base station, comprising: receiving, from a UE, a recommendation of a plurality of candidate beam configurations for the base station to use for a plurality of downlink transmissions; determining, based at least in part on the recommendation of the plurality of candidate beam configurations, to use a first candidate beam configuration of the plurality of candidate beam configurations for a first downlink transmission and a second candidate beam configuration of the plurality of candidate beam configurations for a second downlink transmission; and transmitting, to the UE based at least in part on the determining, the first downlink transmission using the first candidate beam configuration and the second downlink transmission using the second candidate beam configuration.

Aspect 13: The method of aspect 12, further comprising: transmitting reference signal transmissions to the UE using at least at least a plurality of beam configurations, wherein receiving the recommendation of the plurality of candidate beam configurations for the base station is based at least in part on transmitting the reference signal transmissions.

Aspect 14: The method of aspect 13, wherein the reference signal transmissions comprise CSI-RS transmissions or downlink DMRS transmissions.

Aspect 15: The method of any of aspects 12 through 14, wherein the first candidate beam configuration and the second candidate beam configuration comprise different beams, different component carriers, different sets of sub-bands, or any combination thereof.

Aspect 16: The method of any of aspects 12 through 15, further comprising: receiving a scheduling request requesting resources for the recommendation; and transmitting signaling to the UE allocating the resources for the recommendation, wherein receiving the recommendation comprises receiving the recommendation on the allocated resources.

Aspect 17: The method of any of aspects 12 through 16, wherein receiving the recommendation comprises: receiving the recommendation in uplink control information in a control channel or in a MAC-CE in a data channel.

Aspect 18: The method of any of aspects 12 through 17, wherein receiving the recommendation comprises: receiving the recommendation in a scheduled CSI report.

Aspect 19: The method of any of aspects 12 through 18, wherein the recommendation is of the plurality of candidate beam configurations for up to a maximum number of downlink transmissions.

Aspect 20: The method of any of aspects 12 through 19, wherein the first transmission comprises a new transmission or a retransmission, and the second transmission comprises a new transmission or a retransmission.

Aspect 21: An apparatus for wireless communication at a UE, comprising a processor; and a memory coupled with the processor, wherein the memory comprises instructions executable by the processor to cause the apparatus to perform a method of any of aspects 1 through 11.

Aspect 22: An apparatus for wireless communication at a UE, comprising at least one means for performing a method of any of aspects 1 through 11.

Aspect 23: A non-transitory computer-readable medium storing code for wireless communication at a UE, the code comprising instructions executable by a processor to perform a method of any of aspects 1 through 11.

Aspect 24: An apparatus for wireless communication at a base station, comprising a processor; and a memory coupled with the processor, wherein the memory comprises instructions executable by the processor to cause the apparatus to perform a method of any of aspects 12 through 20.

Aspect 25: An apparatus for wireless communication at a base station, comprising at least one means for performing a method of any of aspects 12 through 20.

Aspect 26: A non-transitory computer-readable medium storing code for wireless communication at a base station, the code comprising instructions executable by a processor to perform a method of any of aspects 12 through 20.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   determining a first candidate beam configuration for a network entity to use for a first downlink transmission and a second candidate beam configuration for the network entity to use for a second downlink transmission, the first candidate beam configuration being different than the second candidate beam configuration;
   transmitting a message comprising assistance information indicating a first index associated with the first candidate beam configuration and a second index associated with the second candidate beam configuration, the assistance information further comprising a recommendation that the network entity use the first candidate beam configuration for the first downlink transmission and the second candidate beam configuration for the second downlink transmission; and receiving, based at least in part on transmitting the recommendation and from the network entity, the first downlink transmission in accordance with the first candidate beam configuration and the second downlink transmission in accordance with the second candidate beam configuration.

2. The method of claim 1, further comprising:
receiving reference signal transmissions from the network entity associated with a plurality of beam configurations;
performing measurements on the reference signal transmissions; and
selecting the first candidate beam configuration for the first downlink transmission and the second candidate beam configuration for the second downlink transmission from the plurality of beam configurations based at least in part on performing the measurements.

3. The method of claim 2, wherein the reference signal transmissions comprise channel state information reference signal transmissions or downlink demodulation reference signal transmissions.

4. The method of claim 2, wherein the measurements comprise reference signal received power measurements, reference signal received quality measurements, channel quality indicator measurements, signal-to-interference-plus-noise ratio measurements, or any combination thereof.

5. The method of claim 1, wherein the first candidate beam configuration and the second candidate beam configuration comprise different beams, different component carriers, different sets of subbands, or any combination thereof.

6. The method of claim 1, further comprising:
transmitting a scheduling request requesting resources for transmitting the recommendation; and
receiving signaling from the network entity allocating the resources for transmitting the recommendation, wherein transmitting the recommendation comprises transmitting the recommendation on the allocated resources.

7. The method of claim 1, wherein transmitting the recommendation comprises:
transmitting the recommendation in uplink control information in a control channel or in a medium access control control element in a data channel.

8. The method of claim 1, wherein transmitting the recommendation comprises:
transmitting the recommendation in a scheduled channel state information report.

9. The method of claim 8, further comprising:
determining that the scheduled channel state information report is scheduled to be transmitted within a threshold duration after determining the first candidate beam configuration and the second candidate beam configuration, wherein transmitting the recommendation in the scheduled channel state information report is based at least in part on the determining that the scheduled channel state information report is scheduled to be transmitted within the threshold duration.

10. The method of claim 1, wherein the recommendation is of a plurality of candidate beam configurations for up to a maximum number of downlink transmissions.

11. The method of claim 1, wherein the first downlink transmission comprises a new transmission or a retransmission, and the second downlink transmission comprises a new transmission or a retransmission.

12. A method for wireless communication at a network entity, comprising:

receiving, from a user equipment (UE), a message comprising assistance information indicating a first index associated with a first candidate beam configuration and a second index associated with a second candidate beam configuration, the assistance information further comprising a recommendation of a plurality of candidate beam configurations for the network entity to use for a plurality of downlink transmissions;
determining, based at least in part on the recommendation of the plurality of candidate beam configurations, to use the first candidate beam configuration of the plurality of candidate beam configurations for a first downlink transmission and the second candidate beam configuration of the plurality of candidate beam configurations for a second downlink transmission; and
transmitting, to the UE based at least in part on the determining, the first downlink transmission using the first candidate beam configuration and the second downlink transmission using the second candidate beam configuration.

13. The method of claim 12, further comprising:
transmitting reference signal transmissions to the UE using at least a plurality of beam configurations, wherein receiving the recommendation of the plurality of candidate beam configurations for the network entity is based at least in part on transmitting the reference signal transmissions.

14. The method of claim 13, wherein the reference signal transmissions comprise channel state information reference signal transmissions or downlink demodulation reference signal transmissions.

15. The method of claim 12, wherein the first candidate beam configuration and the second candidate beam configuration comprise different beams, different component carriers, different sets of subbands, or any combination thereof.

16. The method of claim 12, further comprising:
receiving a scheduling request requesting resources for the recommendation; and
transmitting signaling to the UE allocating the resources for the recommendation, wherein receiving the recommendation comprises receiving the recommendation on the allocated resources.

17. The method of claim 12, wherein receiving the recommendation comprises:
receiving the recommendation in uplink control information in a control channel or in a medium access control control element in a data channel.

18. The method of claim 12, wherein receiving the recommendation comprises:
receiving the recommendation in a scheduled channel state information report.

19. The method of claim 12, wherein the recommendation is of the plurality of candidate beam configurations for up to a maximum number of downlink transmissions.

20. The method of claim 12, wherein the first downlink transmission comprises a new transmission or a retransmission, and the second downlink transmission comprises a new transmission or a retransmission.

21. An apparatus for wireless communication at a user equipment (UE), comprising:
one or more processors; and
memory coupled with the one or more processors, wherein the memory comprises instructions executable by the one or more processors to cause the apparatus to:
determine a first candidate beam configuration for a network entity to use for a first downlink transmission and a second candidate beam configuration for the network entity to use for a second downlink transmission, the first candidate beam configuration being different than the second candidate beam configuration;

transmit a message comprising assistance information indicating a first index associated with the first candidate beam configuration and a second index associated with the second candidate beam configuration, the assistance information further comprising a recommendation that the network entity use the first candidate beam configuration for the first downlink transmission and the second candidate beam configuration for the second downlink transmission; and receive, based at least in part on transmitting the recommendation and from the network entity, the first downlink transmission in accordance with the first candidate beam configuration and the second downlink transmission in accordance with the second candidate beam configuration.

22. The apparatus of claim 21, wherein the instructions are further executable by the one or more processors to cause the apparatus to:

receive reference signal transmissions from the network entity transmitted using a plurality of beam configurations;

perform measurements on the reference signal transmissions; and select the first candidate beam configuration for the first downlink transmission and the second candidate beam configuration for the second downlink transmission from the plurality of beam configurations based at least in part on performing the measurements.

23. The apparatus of claim 22, wherein:

the reference signal transmissions comprise channel state information reference signal transmissions or downlink demodulation reference signal transmissions.

24. The apparatus of claim 22, wherein the measurements comprise reference signal received power measurements, reference signal received quality measurements, channel quality indicator measurements, signal-to-interference-plus-noise ratio measurements, or any combination thereof.

25. The apparatus of claim 21, wherein the first candidate beam configuration and the second candidate beam configuration comprise different beams, different component carriers, different sets of subbands, or any combination thereof.

26. An apparatus for wireless communication at a network entity, comprising:

one or more processors; and memory coupled with the one or more processors, wherein the memory comprises instructions executable by the one or more processors to cause the apparatus to:

receive, from a user equipment (UE), a message comprising assistance information indicating a first index associated with a first candidate beam configuration and a second index associated with a second candidate beam configuration, the assistance information further comprising a recommendation of a plurality of candidate beam configurations for the network entity to use for a plurality of downlink transmissions;

determine, based at least in part on the recommendation of the plurality of candidate beam configurations, to use the first candidate beam configuration of the plurality of candidate beam configurations for a first downlink transmission and the second candidate beam configuration of the plurality of candidate beam configurations for a second downlink transmission; and transmit, to the UE based at least in part on the determining, the first downlink transmission using the first candidate beam configuration and the second downlink transmission using the second candidate beam configuration.

27. The apparatus of claim 26, wherein the instructions are further executable by the one or more processors to cause the apparatus to:

transmit reference signal transmissions to the UE using at least a plurality of beam configurations, wherein receiving the recommendation of the plurality of candidate beam configurations for the network entity is based at least in part on transmitting the reference signal transmissions.

28. The apparatus of claim 27, wherein:

the reference signal transmissions comprise channel state information reference signal transmissions or downlink demodulation reference signal transmissions.

29. The apparatus of claim 26, wherein the first candidate beam configuration and the second candidate beam configuration comprise different beams, different component carriers, different sets of subbands, or any combination thereof.

30. The apparatus of claim 26, wherein the instructions are further executable by the one or more processors to cause the apparatus to:

receive a scheduling request requesting resources for the recommendation; and transmit signaling to the UE allocating the resources for the recommendation, wherein receiving the recommendation comprises receiving the recommendation on the allocated resources.

* * * * *